US011204421B2

(12) United States Patent
Inoue et al.

(10) Patent No.: US 11,204,421 B2
(45) Date of Patent: Dec. 21, 2021

(54) DISTANCE MEASURING DEVICE

(71) Applicant: Panasonic Intellectual Property Management Co., Ltd., Osaka (JP)

(72) Inventors: Akito Inoue, Kyoto (JP); Masato Takemoto, Osaka (JP); Shinzo Koyama, Osaka (JP); Motonori Ishii, Osaka (JP); Shigeru Saitou, Kyoto (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 789 days.

(21) Appl. No.: 16/040,624

(22) Filed: Jul. 20, 2018

(65) Prior Publication Data

US 2018/0329063 A1 Nov. 15, 2018

Related U.S. Application Data

(63) Continuation of application No. PCT/JP2017/005503, filed on Feb. 15, 2017.

(30) Foreign Application Priority Data

Feb. 17, 2016 (JP) .............................. JP2016-028436

(51) Int. Cl.
*G01S 17/14* (2020.01)
*G01S 7/487* (2006.01)
*G01S 17/10* (2020.01)
*G01S 17/36* (2006.01)
*G01S 7/4865* (2020.01)
(Continued)

(52) U.S. Cl.
CPC .............. *G01S 17/14* (2020.01); *G01S 7/487* (2013.01); *G01S 7/4863* (2013.01);
(Continued)

(58) Field of Classification Search
None
See application file for complete search history.

(56) References Cited

U.S. PATENT DOCUMENTS 6,115,112 A * 9/2000 Hertzman ............... G01S 7/487
356/5.01
10,557,703 B2 * 2/2020 Yates .................... G01S 7/4865
(Continued)

FOREIGN PATENT DOCUMENTS

JP 407-260937 A 10/1995
JP 2000-506971 A 6/2000
(Continued)

OTHER PUBLICATIONS

International Search Report issued in Application No. PCT/JP2017/005503 dated May 16, 2017, with English translation.

*Primary Examiner* — Yuqing Xiao
*Assistant Examiner* — Amir J Askarian
(74) *Attorney, Agent, or Firm* — McDermott Will & Emery LLP

(57) ABSTRACT

A distance measuring device includes a controller and a distance calculator. The controller sets, in a first time period, a first measurement time range corresponding to a first measurement distance range; causes a light emitter to emit light and places a light receiver into an exposure state, in the first measurement time range; sets, in a second time period, a second measurement time range corresponding to a second measurement distance range; and causes the light emitter to emit light and places the light receiver into an exposure state, in the second measurement time range. At least one measurement condition is different between the first and second time periods. The distance calculator calculates the distance from the distance measuring device to a measurement target, based on the time from the emission to the
(Continued)

reflection of light. The time is in at least one of the first and second time periods.

16 Claims, 25 Drawing Sheets

(51) Int. Cl.
  *G01S 17/04* (2020.01)
  *G01S 17/18* (2020.01)
  *G01S 17/86* (2020.01)
  *G01S 17/894* (2020.01)
  *G01S 7/4863* (2020.01)
  *G01S 7/497* (2006.01)

(52) U.S. Cl.
  CPC ............ *G01S 7/4865* (2013.01); *G01S 7/497* (2013.01); *G01S 17/04* (2020.01); *G01S 17/10* (2013.01); *G01S 17/18* (2020.01); *G01S 17/36* (2013.01); *G01S 17/86* (2020.01); *G01S 17/894* (2020.01)

(56) References Cited

U.S. PATENT DOCUMENTS

| | | | |
|---|---|---|---|
| 2001/0021011 A1* | 9/2001 | Ono | G06T 7/586 |
| | | | 356/3 |
| 2001/0046317 A1 | 11/2001 | Kamon et al. | |
| 2001/0052985 A1* | 12/2001 | Ono | G01S 17/89 |
| | | | 356/614 |
| 2002/0040971 A1* | 4/2002 | Ono | G01S 17/08 |
| | | | 250/559.38 |
| 2004/0233416 A1 | 11/2004 | Doemens et al. | |
| 2009/0185159 A1* | 7/2009 | Rohner | G01S 7/4865 |
| | | | 356/5.01 |
| 2011/0157354 A1 | 6/2011 | Kawahito | |

FOREIGN PATENT DOCUMENTS

| | | |
|---|---|---|
| JP | 2001-337166 A | 12/2001 |
| JP | 2004-538491 A | 12/2004 |
| JP | 2009-537832 A | 10/2009 |
| JP | 2013-096941 A | 5/2013 |
| WO | 2010/013779 A1 | 2/2010 |

* cited by examiner

DISTANCE MEASURING DEVICE

CROSS REFERENCE TO RELATED APPLICATIONS

This application is a U.S. continuation application of PCT International Patent Application Number PCT/JP2017/005503 filed on Feb. 15, 2017, claiming the benefit of priority of Japanese Patent Application Number 2016-028436 filed on Feb. 17, 2016, the entire contents of which are hereby incorporated by reference.

BACKGROUND

1. Technical Field

The present disclosure relates to a distance measuring device.

2. Description of the Related Art

Methods for measuring the distance from a distance measuring device to an object which is a measurement target (hereinafter referred to as a measurement target) include a time of flight (TOF) method for measuring time required from when light is emitted from the distance measuring device toward a measurement target to when the light is reflected by the object and returns back to the distance measuring device. In comparison with other distance measuring methods such as methods using compound-eye imaging devices, the TOF method has a disadvantage of requiring a light source in addition to a distance measuring device but has an advantage of being able to measure the distance to an object located at a distant location with high resolution by increasing the intensity of light from the light source.

SUMMARY

However, the TOF method has a problem of requiring longer measurement time because a measurement range is set to be wider.

More specifically, the TOF method emits a light pulse to a measurement target, and receives the reflected light from the measurement target at exposure timings synchronized with light emission timings with delay amounts, and calculates the distance to the target based on output in each exposure. For this reason, a light pulse having a stronger intensity is required when a measurement target is located at a more distant location, which lengthens waiting time for preventing time difference between light emission and exposure paired with each other, and thus lengthens time required for the pair of light emission and exposure. In addition, when a measurement target is located at a distant location, a large number of pairs of light emission and exposure need to be executed in order to perform distance measurement with high distance resolution, which lengthens measurement time.

The present disclosure was made in view of the circumstances as such, and has a main object to provide a distance measuring device capable of efficiently measuring a distance.

In order to achieve the above object, a distance measuring device according to an aspect of the present disclosure includes: a light emitter which emits emission light; a light receiver capable of receiving, during exposure, reflected light resulting from the emission light and reflected by a measurement target; a controller which controls the light emitter and the light receiver; a distance calculator which calculates a distance from the distance measuring device to the measurement target, based on time from when the light emitter emits the emission light to when the light receiver receives the reflected light; and an output terminal which outputs the calculated distance, wherein the controller: sets, in a first time period, a first measurement time range which corresponds to a first measurement distance range; causes the light emitter to emit emission light and places the light receiver into an exposure state, in the first measurement time range; sets, in a second time period, a second measurement time range which corresponds to a second measurement distance range; and causes the light emitter to emit emission light and places the light receiver into an exposure state, in the second measurement time range, at least one measurement condition is different between the first time period and the second time period, and the distance calculator calculates the distance from the distance measuring device to the measurement target, based on the time from when the light emitter emits the emission light to when the light receiver receives the reflected light, the time being in at least one of the first time period and the second time period.

In addition, in order to achieve the above object, a distance measuring device according to an aspect of the present disclosure includes: a light emitter which emits emission light; a light receiver capable of receiving, during exposure, reflected light resulting from the emission light and reflected by a measurement target; a controller which controls the light emitter and the light receiver; a distance calculator which calculates a distance from the distance measuring device to the measurement target, based on time from when the light emitter emits the emission light to when the light receiver receives the reflected light; and an output terminal which outputs the calculated distance, wherein the controller: sets, in a first time period, a first measurement time range which corresponds to a first measurement distance range; causes the light emitter to emit emission light and places the light receiver into an exposure state, in the first measurement time range; divides, a second measurement time range which corresponds to a second measurement distance range into K' segments in a second time period, K' being a natural number larger than or equal to 2; and repeats a cycle period including time during which the light emitter emits emission light and the second measurement time range, and places the light receiver into an exposure state at least in one segment in the K' segments, in at least one of cycle periods, and the distance calculator calculates the distance from the distance measuring device to the measurement target, based on the time from when the light emitter emits the emission light to when the light receiver receives the reflected light, the time being in at least one of the first time period and the second time period.

It is to be noted that these general and specific aspects may be implemented using a system, a method, an integrated circuit, a computer program, and a recording medium, and any combination of systems, methods, integrated circuits, computer programs, and recording media.

Main effects obtainable according to the present disclosure are simply described below. The present disclosure enables implementation of a distance measuring device capable of efficiently measuring a distance.

BRIEF DESCRIPTION OF DRAWINGS

These and other objects, advantages and features of the disclosure will become apparent from the following descrip

DETAILED DESCRIPTION OF THE EMBODIMENTS

Hereinafter, exemplary embodiments of the present disclosure are described in greater detail with reference to the Drawings. Each of the exemplary embodiments described below indicates a specific example. The numerical values, shapes, materials, constituent elements, the arrangement and connection of the constituent elements, steps, the processing order of the steps etc. indicated in the following exemplary embodiments are mere examples, and therefore do not limit the scope of the present disclosure. Therefore, among the constituent elements in the following exemplary embodiments, constituent elements not recited in any one of the independent claims that define the most generic concept are described as arbitrary constituent elements that constitute the embodiments.

Hereinafter, embodiments of the present disclosure are described in detail with reference to the drawings.

Embodiment 1

Figure 1:
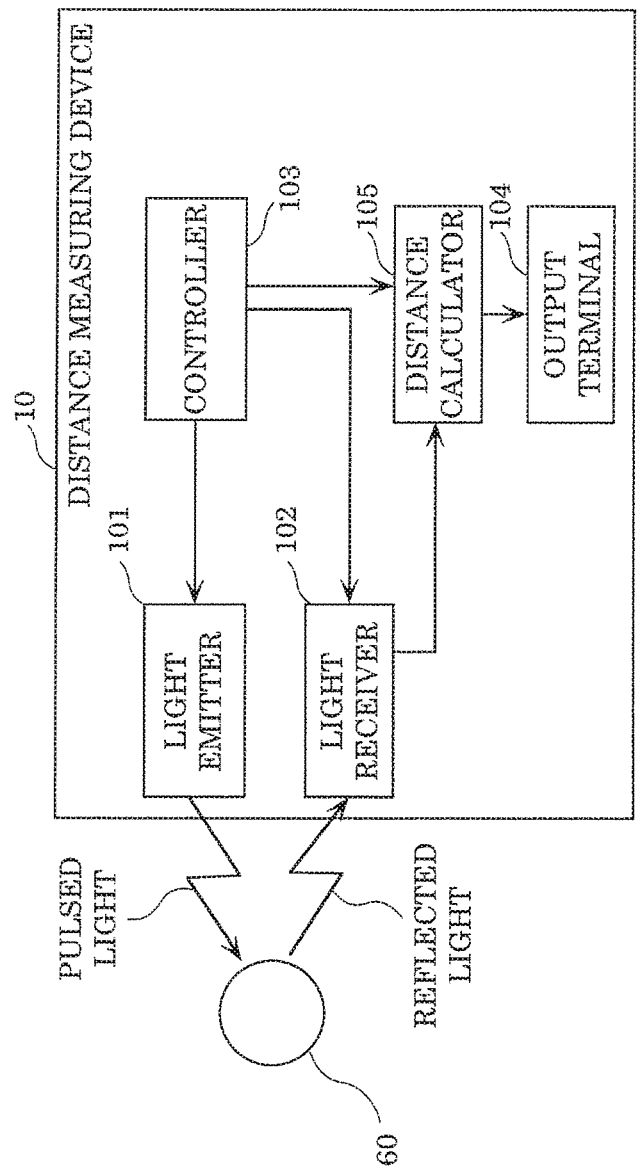
- FIG. 1 is a block diagram indicating an example of a functional configuration of a distance measuring device according to Embodiment 1.

FIG. 1 is a block diagram indicating an example of a functional configuration of distance measuring device 10 according to this embodiment.

Distance measuring device 10 illustrated in FIG. 1 includes: light emitter 101; light receiver 102; controller 103; output terminal 104; and distance calculator 105. FIG. 1 illustrates measurement target 60 as an example.

Light emitter 101 is controlled by controller 103, and emits emission light. Light emitter 101 includes a light source such as a laser light source, and outputs a light pulse (emission light) by causing the light source to emit light having a predetermined light pulse width. It is to be noted that the intensity of a light pulse that is emitted by light emitter 101 is, for example, approximately at class 1 or class 2 which are not regarded as involving danger according to a predetermined safety standard.

A light source that emits light having a single wavelength, a short pulse, and strong intensity is suitable for distance measurement, and a pulse laser is suitable. Alternatively, a different light source that is a light-emitting diode (LED), a halogen lamp, or the like can be also used as the light source. In addition, it may be advantageous that wavelengths of infrared rays are used as the wavelengths of the light source in consideration of use in a city, a town, or the like, but the wavelengths are not particularly limited.

Light receiver 102 is controlled by controller 103, and receives reflected light that results from the emission light and reflected by measurement target 60. Light receiver 102 is capable of receiving, during exposure, the reflected light under control of controller 103. Light receiver 102 includes, for example, photodiodes. In addition, light receiver 102 may include an avalanche photodiode or a photoelectric multiplier, or an image sensor in which light receiving elements are arranged two-dimensionally. In this case, light receiver 102 may include an optical system such as a lens as necessary. In particular, an independent light receiving element in the case where light receiver 102 includes an image sensor is referred to as a pixel. Furthermore, when light receiver 102 includes an image sensor, data analysis such as image processing and recognition processing can be performed at a later stage.

In addition, frequency information can also be obtained by providing light receiver 102 with a filter that shields or transmits light having a predetermined frequency. In other words, the scope of the present disclosure is not limited by the configuration of light receiver 102.

Controller 103 controls light emitter 101 and light receiver 102. Controller 103 controls light emitter 101 and light receiver 102 under a predetermined measurement condition during a first time period, and causes distance calculator 105 to calculate the distance from distance measuring device 10 to measurement target 60. More specifically, controller 103 divides a first measurement time range into K (K is a natural number greater than or equal to 2) segments in the first time period, and repeats, K times, a cycle period including light emission time during which light emitter 101 emits emission light and the first measurement time range. Controller 103 causes light emitter 101 to emit emission light for each cycle period, and places light receiver 102 into an exposure state in at least one of K segments for each cycle period. Controller 103 performs control for varying measurement conditions between the first time period and the second time period.

In this embodiment, controller 103 divides a measurement time range corresponding to a measurement distance range starting with a predetermined position into K (K is a natural number larger than or equal to 1) segments in a first time period, and repeats, K times, a cycle period including time during which light emitter 101 emits emission light and the measurement time range. Controller 103 causes light emitter 101 to emit emission light for each cycle period, and places light receiver 102 into an exposure state in at least one of K segments for each cycle period. Here, controller 103 performs control for varying a measurement condition including at least the measurement distance range between the first time period and a second time period following the first time period.

Distance calculator 105 calculates the distance from distance measuring device 10 to measurement target 60, based on the time from when light is emitted by light emitter 101 to when the light is received by light receiver 102 in each of the first time period and the second time period.

Output terminal 104 outputs the calculated distance from distance measuring device 10 to measurement target 60.

Next, distance measuring operations performed by distance measuring device 10 configured as above are described.

Figure 2:
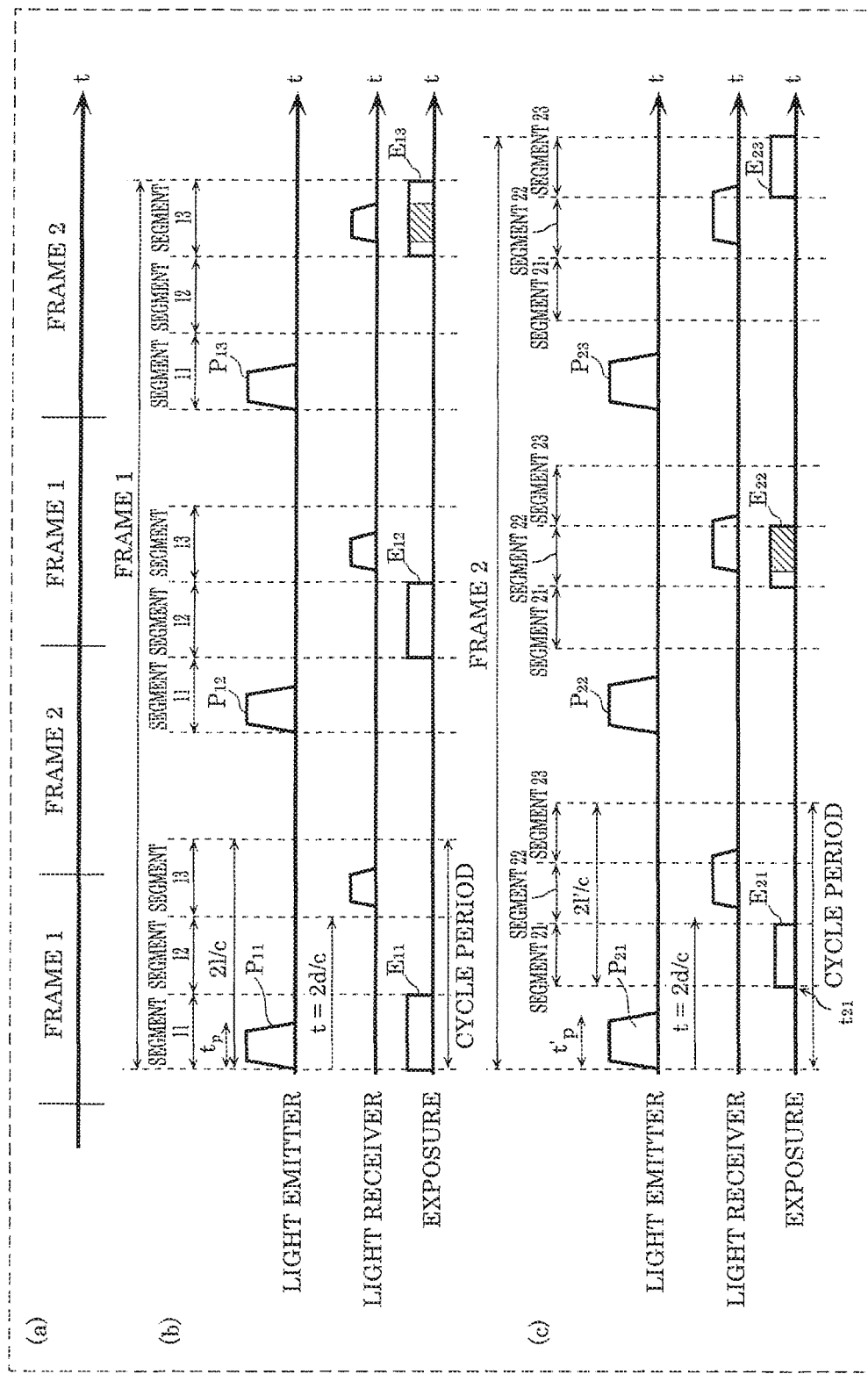
FIG. 2 is a diagram illustrating an example of a sequence of measurement performed by the distance measuring device according to Embodiment 1.

FIG. 2 is a diagram illustrating an example of a sequence of distance measuring operations performed by distance measuring device 10 according to this embodiment.

In FIG. 2, (a) illustrates a sequence of the distance measurement. Distance data is measured in each of the time periods divided by vertical lines. In this disclosure, distance data is measured in one or more time periods, and distance measurement is performed under different measurement conditions in at least one of the one or more time periods. Here, the measurement conditions include at least one of a pulse cycle, pulse intensity, and a pulse width of emission light, a method for encoding a pulse string, an exposure time width, an exposure cycle, and the number of times of exposure performed by light receiver 102, a method for controlling a driving circuit that drives light receiver 102; and a method for processing data such as image reading-out ranges in light receiver 102. It is to be noted that the measurement conditions are not limited to the examples listed above.

It is to be noted that there is no need to obtain distance data in all of the time periods, and measurement of luminance data may be included. In addition, such data may be output after measurement is completed in all of the time periods, or may be output each time measurement in a certain time period is completed. A method for performing such measurement while varying measurement conditions in one of the time periods is included in the scope of the present disclosure.

In FIG. 2, (b) illustrates an example of a sequence of emission light, reflected light, and exposure in each measurement time. It is to be noted that the scope of the present disclosure is not limited to this distance measuring method illustrated with reference to FIG. 2.

Controller 103 firstly determines distance range I in which distance measurement is performed, and then determines measurement time range $2l/c$ which corresponds to the distance on a time axis. Next, the determined measurement time range is divided into single or plural segments. The upper limit for the measurement time range in one segment is determined: by the intensity of a light source and a sensitivity of light receiver 102; and under the condition that pulsed light reflected by a measurement target can be detected by light receiver 102. In synchronization with the start of measurement time range $2l/c$ or with a delay or in advance by a certain time, emission of pulsed light is performed at least once, and exposure is performed in at least one segment out of the divided segment(s). As a matter of course, a segment in which no exposure is performed is provided. This operation is repeated by the number of divided segment(s), and measurement is performed in an exposure-target segment that is different for each operation. Since a light signal can be detected only when reflected light returns during exposure, the distance to the measurement target can be determined correspondingly to the divided segment. It is to be noted that the present disclosure encompasses also a case in which exposure-target segments are limited, such as a case in which the number of divided segments and the number of times of repetition are different. At this time, the lower limit for repetition time is determined: by the intensity of the emitted pulsed light and a sensitivity of light receiver 102; and under the condition that pulsed light intensity sufficiently attenuates, and no erroneous detection of light occurs in the next measurement.

The correspondence between a measurement time range, a segment, a measurement distance range, and a distance resolution is indicated as below.

When light emitted from a light source is reflected by measurement target 60 at a location distant by distance d and returns, time t is represented according to Expression 1 below. Here, c denotes a velocity of light, and a numerical value "2" is determined considering a round trip of light emitted from the light source.

[Math. 1]

$$t = \frac{2d}{c} \quad \text{(Expression 1)}$$

When the measurement distance range is l, measurement time range $t_a$ corresponding to the measurement distance range l is represented according to Expression 2, with reference to Expression 1.

[Math. 2]

$$t_a = \frac{2l}{c} \quad \text{(Expression 2)}$$

Measurement time range $t_a$ is equally divided into N segments, and the N segments are respectively assigned numerical numbers 1, 2, 3, . . . in the order of light emission time. When the reflected light returns to distance measuring device 10 in the time range of segment i represented according to Expression 3.

[Math. 3]

$$t_i = \frac{t_a(i-1)}{N} \sim \frac{t_a i}{N} \quad \text{(Expression 3)}$$

[Math. 4]

$$d_i = \frac{ct_a(i-1)}{2N} \sim \frac{ct_a i}{2N} \quad \text{(Expression 4)}$$

Here, the width of $d_i$ is $ct_a/2N$, and the distance between the measurement target and the device itself can be measured using the resolution.

It is to be noted that a part of the measurement time range may be divided into segments. An algorithm for performing division may be configured in distance measuring device 10, or a user may arbitrarily set the division.

Next, a description is given of driving of light emitter 101 and light receiver 102 in one segment i.

Firstly, controller 103 causes light emitter 101 to output a light pulse (emission light). The emitted pulsed light reaches measurement target 60 at the location distant by distance d and then reflected, and the reflected light returns to distance measuring device 10 time t later from the time of output (emission) of the pulsed light. In order to detect the reflected light, controller 103 performs control for placing light receiver 102 into an exposure state in time range ti that is delayed by time represented by Expression 3 from the time of emission in segment i. When controller 103 receives light (reflected light) having a signal strength equal to or larger than a pre-set signal strength in time range ti (during exposure), the distance (represented by a minimum value or an average value) indicating the distance range corresponding to time range ti is stored in a not-illustrated memory as the distance to measurement target 60, or is output to output terminal 104.

It is to be noted that, in a first time period in (b) of FIG. 2: an example of a case in which the number N of segments is 3 is illustrated; light emitter 101 emits a light pulse ($P_{11}$, $P_{12}$, or $P_{13}$) for each of cycle periods; and light receiver 102 is in an exposure state (exposure time $E_{11}$, $E_{12}$, or $E_{13}$) in at least one of the segments (segment 11, segment 12, and segment 13) for each of cycle periods. In (b) of FIG. 2, since the reflected light returns to segment 13, the reflected light is detected in a third cycle period in which exposure is performed in exposure time $E_{13}$ which is an exposure period.

In this example, all of the segments are exposed in one time period, but this is not required. For example, a possible method is a method in which only segment 11 is exposed in the first time period and segments 12 and 13 are exposed in the second time period.

Whether reflected light is detected or not is determined according to one of two conceivable methods as indicated below. A first method is a method for measuring a background light intensity, and when the measured background light intensity in a segment has a significant difference from the signal strength of light receiver 102 during exposure, determining that a measurement target has detected in the segment. A second method is a method for storing a signal strength in each segment, and determining that a measurement target has detected in a segment having a maximum signal strength.

In the case of the first method, only presence or absence of a signal is checked, and the magnitude of the signal strength is not required to be recorded. For example, a method for increasing a detection efficiency using an element capable of detecting weak light corresponding to approximately one photon such as an avalanche photodiode and a photoelectric multiplier is advantageous. In the case of the second method, a method for calculating a signal amount using a photodiode is conceivable, or the number of photons may be counted using an avalanche photodiode and a photoelectric multiplier. In the case of the second method, the time widths of exposure time $E_{11}$ to $E_{13}$ and the time widths of segments 11 to 13 in (b) of FIG. 2 do not always match each other. In (b) of FIG. 2, a pair of light emission (output) of pulsed light and exposure performed per segment is illustrated. However, it may be advantageous to generate a pulse string a certain number of times in measurement performed for each segment, expose and integrate the resulting pulse strings, and use the sum or average of the pulse strings when calculating distance data. At this time, the light emission of the light pulses do not need to be completely cyclic, and it may be advantageous to combine measurement using a long light emission cycle and measurement using a short light emission cycle both of which includes, at random, time during which light emission is not performed. Furthermore, a method involving delay in light emission timing may be used to perform encoding and prevent erroneous detection. It is desirable but not always necessary that the width of emission light pulse is shorter than an exposure width.

By performing the distance measuring operation as described above, it is possible to calculate the distance between measurement target 60 and distance measuring device 10.

In FIG. 2, (c) illustrates an example of a measurement sequence in a second time period different from the first time period. The first time period and the second time period are adjacent to each other in (a) of FIG. 2, but do not always need to be adjacent. It may be advantageous to introduce other measurement such as measurement of background light intensity between the two time periods.

Controller 103 determines a predetermined measurement distance range in the second time period, divides the determined measurement distance range into a single or plural segments, and performs a distance measuring operation for each of the segments.

More specifically, in the second time period illustrated in (c) of FIG. 2, measurement distance range l' is different from measurement distance range l in the first time period. In (c) of FIG. 2, an exemplary case where N is 3 is illustrated. In the illustrated example, light emitter 101 emits light pulse ($P_{21}$, $P_{22}$, or $P_{23}$) for each cycle period, and at least one segment out of segments (segment 21, segment 22, and segment 23) of light receiver 102 is placed into an exposure state (in exposure time $E_{21}$, $E_{22}$, or $E_{23}$) for each cycle period. In (c) of FIG. 2, since the reflected light returns to segment 23, the reflected light is detected in a third cycle period in which exposure is performed in exposure time $E_{23}$.

More specifically, in the first time period illustrated in (b) of FIG. 2, distance measuring device 10 performs a distance measuring operation under measurement conditions that a distance measurement range is 1, the number of segments is 3, and the light pulse width of emission light is tp. On the other hand, in the second time period illustrated in (c) of FIG. 2, distance measuring device 10 performs a distance measuring operation under different measurement conditions that a distance measurement range is l', the number of segments is 3, and the light pulse width of emission light is tp'.

It is to be noted that measurement conditions such as the number of divisions, the intensity of emission light, and the cycle period of the light source in addition to the above listed ones may be changed. As an example, measuring methods other than direct methods, and physical amounts of a measurement target such as luminance and colors may be changed between the first time period and the second time period. Distance measuring operations can be performed under such various conditions when distance measuring device 10 is configured to have a circuit configuration which provides both a function for comparing the intensity of light with an arbitrarily set threshold value and determining the magnitude relation and a function for measuring the intensity of light.

As described above, distance measuring device 10 according to this embodiment is capable of executing a pair of light emission and exposure adaptively under measurement conditions different between the first time period and the second time period, and thus performing distance measuring operations at high distance resolutions (high distance measuring accuracies) even when the number of pairs of light emission and exposure is reduced.

It is to be noted that, in the above, calibration of distance measuring device 10 may be performed as appropriate by, for example, measuring the intensity of background light before, during, or after distance measurement.

Figure 20:
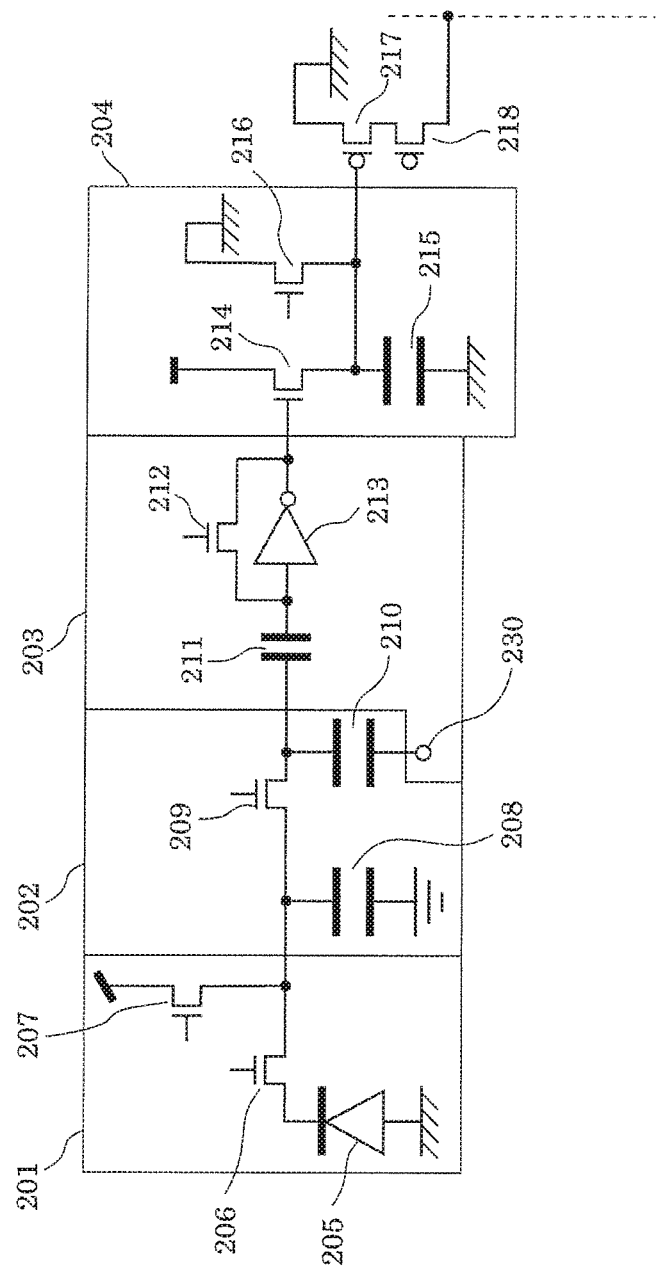
FIG. 20 is a diagram illustrating an example of a circuit configuration of a pixel circuit according to Embodiment 1.

Hereinafter, an example of a circuit configuration of a pixel circuit according to this embodiment is illustrated with reference to the drawings. FIG. 20 is a diagram illustrating the example of the circuit configuration of the pixel circuit according to this embodiment.

As illustrated in FIG. 20, the pixel circuit according to this embodiment includes: light receiving circuit 201; counter circuit 202; comparator circuit 203; storage circuit 204; light receiving element 205; transfer transistor 206; reset transistor 207; charge accumulating capacitor 208; counter transistor 209; counter capacitor 210; direct-current cutting capacitor 211; clamp transistor 212; inverter 213; input transistor 214; storage capacitor 215; storage node reset transistor 216, amplifier transistor 217; and selector transistor 218. Here, 230 denotes an output allowance signal.

First, a description is given of an operation of a circuit which performs distance measurement through comparison between the intensity of light and a threshold value. The distance measurement includes a time period for detecting background light and setting a threshold value and a time for distance measurement.

The background light detecting operation is performed after turning off a signal light from the light source. At this time, only the background light enters as incident light to distance measuring device 10. First, reset transistor 207 is turned ON, transfer transistor 206 is turned ON, and light receiving element 205 is reset. Subsequently, both of transfer transistor 206 and reset transistor 207 are turned OFF, and transfer transistor 206 is turned ON only in a period of to seconds. When light enters in the period of $t_a$ seconds, charge corresponding to the incident light is accumulated in charge accumulating capacitor 208 via transfer transistor 206. After $t_a$ seconds, transfer transistor 206 is turned OFF, a voltage (counter trigger) is applied to the gate of counter transistor 209, and counter transistor 209 is turned ON, so as to transfer the charge to counter capacitor 210. Subsequently, the counter trigger is turned OFF, that is, counter transistor 209 is turned OFF, reset transistor 207 is turned ON, and charge in charge accumulating capacitor 208 is reset. These processes are repeated b times. Subsequently, a threshold value setting signal of comparator circuit 203 is turned ON. By applying the signal to clamp transistor 212, the voltage of counter capacitor 210 corresponding to the background light is stored as a voltage at both sides of direct-current cutting capacitor 211. Meanwhile, the output allowance signal is set to an arbitrary voltage E.

The distance measuring operation is performed after light emission of the light source is ON. The operation described below corresponds to one operation performed in a single cycle period. An operation in a cycle period corresponding to measurement in i-th segment is explained. First, as in the period in which background light is detected, reset transistor 207 is turned ON and charge in charge accumulating capacitor 208 is reset in advance. Subsequently, a signal light pulse is output. For the light pulse, the transfer gate is turned ON in the period represented according to Expression 3. After the transfer gate is turned ON only in a period of $t_a$ seconds, a counter trigger is turned ON, and charge generated by light receiving element 205 is transferred to counter capacitor 210. These processes are repeated b times. Subsequently, the voltage of the output allowance signal is changed to 0. At this time, when the absolute value of a counter value stored in counter capacitor 210 is larger than the absolute value of the sum of the threshold value of comparator circuit 203 which has been set in the background light detection period and threshold value E of a voltage which has been arbitrarily set, the state of inverter 213 in the comparator circuit changes, and input transistor 214 is turned ON. This threshold value can be adjusted by changing voltage E at the lower end of counter capacitor 210, and thus can be set to a value suitable for a use environment. Here, the voltage value of the output allowance signal is E in the background light detection period and 0 in a distance measurement period. However, voltage values are not limited thereto. For example, the voltage value of the output allowance signal may be 0 in the background light detection period and −E in a distance measurement period. It is only necessary that a setting value in the background light detection period and a setting value in the distance measurement period are set to be different.

A time signal (voltage) corresponding to a distance signal is applied to the drain of input transistor 214. For example, the voltage may be (1+i/R) volt (R is an arbitrary integer). When the gate of input transistor 214 is turned ON by comparator circuit 203, a voltage corresponding to the distance signal is stored in storage capacitor 215.

After the end of all of the periods, a voltage corresponding to the distance to the measurement target is stored in storage capacitor 215 of each pixel. This signal is output during the distance signal output period. First, selector transistor 218 is turned ON. At this time, the voltage stored in storage capacitor 215 is output by amplifier transistor 217. In reality, an offset voltage unique to amplifier transistor 217 is superimposed onto the voltage. Subsequently, storage node reset transistor 216 is turned ON, and the voltage of storage capacitor 215 is reset. An output voltage is read out from amplifier transistor 217 after storage node reset transistor 216 is turned OFF. A circuit such as a correlated double sampling (CDS) circuit is provided at the following stage of a readout line, and the offset voltage is removed to obtain distance data.

Here, a description is given of the relationship between the operation performed by the pixel circuit illustrated in FIG. 20 and the above-described distance measuring operation sequence.

In the pixel circuit illustrated in FIG. 20, prior to exposure, transfer transistor 206, reset transistor 207, and counter transistor 209 are turned ON, and photodiode 201, charge accumulating capacitor 208, and counter capacitor 210 are set to a reset voltage.

Next, after counter transistor 209 is turned OFF, reset transistor 207 is turned OFF.

After this point of time, electrons subjected to photoelectric conversion in photodiode 201 are accumulated in the parasitic capacitance of photodiode 201 and charge accumulating capacitor 208, which corresponds to a start of exposure, specifically corresponding to the start time of each of exposure times $E_{11}$, $E_{12}$, and $E_{13}$ in (b) of FIG. 2.

It is possible to arbitrarily change exposure start times by changing times at which reset transistor 207 is turned OFF. Thus, it is only necessary that reset transistor 207 is turned OFF at the start time of exposure time $E_{11}$ in the first cycle period in (b) of FIG. 2, that reset transistor 207 is turned OFF in synchronization with the start of exposure time $E_{12}$ in the second cycle period in (b) of FIG. 2, and that reset transistor 207 is turned OFF in synchronization with the start of exposure time $E_{13}$ in the third cycle period in (b) of FIG. 2

Next, transfer transistor 206 is turned OFF after waiting for a certain time $t_a$ from time at which reset transistor 207 is turned OFF. After this point of time, electrons subjected to photoelectric conversion in light receiving element 205 do not move to charge accumulating capacitor 208, and thus this point of time is an exposure end time. In other words, this point of time corresponds to an end time of each of exposure times $E_{11}$, $E_{12}$, and $E_{13}$ in (b) of FIG. 2.

When the number of segments is n, time a from an exposure start to an exposure end may be 2l/nc. More specifically, time from when reset transistor 207 is turned OFF to when transfer transistor 206 is turned OFF may be 2l/nc.

The start time and end time of each of exposure times $E_{11}$, $E_{12}$, and $E_{13}$ in the segments are determined by measuring a delay time from emission of pulsed light. A method using a clock circuit is conceivable as an example of a method for synchronizing light emission and exposure. It is possible to determine the exposure start time and the exposure end time by counting the number of clocks from emission of pulsed light. It is to be noted that methods for synchronizing light emission and exposure are not limited to the above method.

Although distance measuring device 10 described above performs distance measurement in one of the first time period and the second time period while varying measurement conditions, such distance measurement may be performed in at least one of the first time period and the second time period. More specifically, controller 103 sets a first measurement time range which is a time range corresponding to a first measurement distance range in a first time period and causes light emitter 101 to emit emission light in the first measurement time range, so as to place light receiver 102 into an exposure state. Furthermore, controller 103 sets a second measurement time range which is a time range corresponding to a second measurement distance range in a second time period and causes light emitter 101 to emit emission light in the second measurement time range, so as to place light receiver 102 into an exposure state. Controller 103 varies at least one measurement condition between the first time period and the second time period. It is only necessary for distance calculator 105 to calculate the distance from distance measuring device 10 to measurement target 60 based on time from the point of time at which light emitter 101 emits emission light in at least one of the first time period and the second time period to the point of time at which light receiver 102 receives reflected light.

Figure 24:
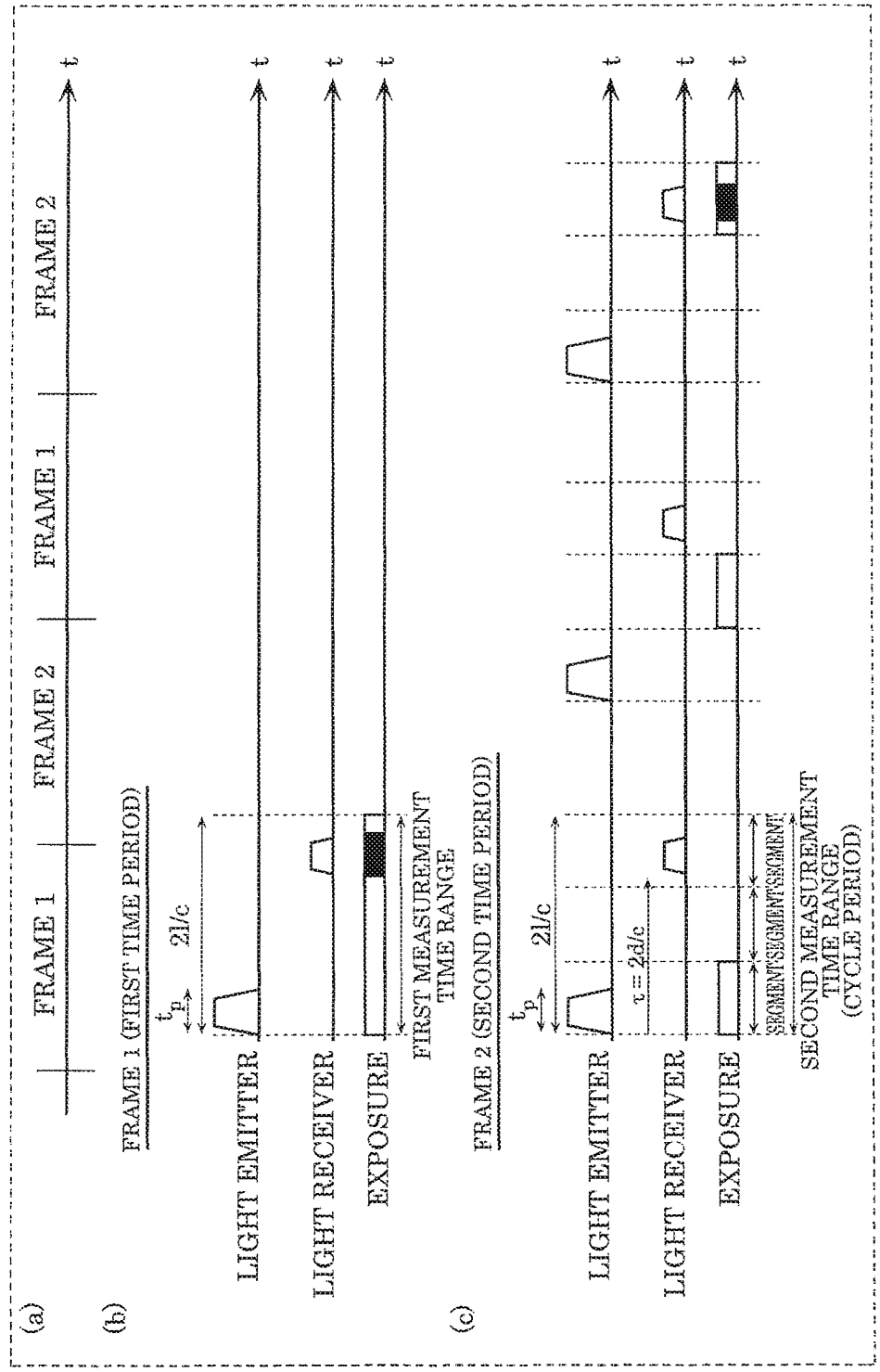
FIG. 24 is a diagram illustrating an example of a sequence of distance measuring operations performed by the distance measuring device according to a variation of Embodiment 1.

In addition, distance measuring device 10 may perform distance measurement several times, and distance measurement in one of the times may be performed by dividing a measurement segment. FIG. 24 illustrates an example of a sequence of distance measuring operations in this case.

FIG. 24 is a diagram illustrating the example of the sequence of distance measuring operations performed by distance measuring device 10 according to a variation of Embodiment 1. The same elements as in FIG. 2 are assigned the same names, and thus are not described in detail again.

As illustrated in FIG. 24, controller 103 of distance measuring device 10 according to the variation of Embodiment 1 sets a first measurement time range which corresponds to a first measurement distance range in a first time period, causes light emitter 101 to emit emission light in the first measurement time range, so as to place light receiver 102 into an exposure state. Furthermore, controller 103 may divide a second measurement time range into K' (K' is a natural number greater than or equal to 2) segments in the second time period, and repeats a cycle period including light emission time of light emitter 101 and the second measurement time range, and may place light receiver 102 into an exposure state in at least one of the K' segments in at least one of the cycle periods. At this time, it is only necessary for distance calculator 105 to calculate the distance from distance measuring device 10 to measurement target 60 based on time from the point of time at which light emitter 101 emits emission light to the point of time at which light receiver 102 receives reflected light in at least one of the first time period and the second time period.

Embodiment 2

Although a case where there is no limitation on measurement condition determining methods performed in the first time period and the second time period is described in Embodiment 1, measurement conditions in a second time period may be determined according to the result of measuring distance data in a first time period as indicated below. Specifically, controller 103 may determine the measurement conditions in the second time period based on the distance from distance measuring device 10 to measurement target 60 calculated in the first time period. This case is described below as Embodiment 2 focusing on differences from Embodiment 1.

Distance measuring device 10 according to this embodiment is different from distance measuring device 10 according to Embodiment 1 in operation details of controller 103 and distance calculator 105.

Specifically, controller 103 divides a first measurement time range into K (K is a natural number greater than or equal to 1) segment(s) in the first time period, repeats a cycle period including time during which light emitter 101 emits emission light and the first measurement time range K time(s), causes light emitter 101 to emit emission light for each of first cycle periods, and places light receiver 102 into an exposure state in at least one of the K segments for the first cycle period.

Controller 103 changes a second measurement distance range in the second time period when controller 103 confirms that light receiver 102 does not receive reflected light and measurement target 60 is not present in the first measurement distance range. Subsequently, controller 103 controls light receiver 102 using the second distance measurement range. More specifically, in this case, controller 103 controls, in the second time period, light receiver 102 using the second measurement time range corresponding to the second measurement distance range which is not included in the measurement distance range used in the first time period.

It is assumed that controller 103 confirms that light receiver 102 has received reflected light, and measurement target 60 is present in an L-th segment (L is a natural number smaller than or equal to K) in the K segments based on the reflected light. At that time, controller 103 performs control of dividing the second measurement time range smaller than the first measurement time range which includes the L-th segment and using the first time period into K' (K' is a natural number larger than or equal to 2) in the second time period, repeats the second cycle period including time during which light emitter 101 emits emission light and the second measurement time range K' time(s), and placing light receiver 102 into an exposure state in at least one segment in the K' segments for each of second cycle periods.

Distance calculator 105 may calculate the distance from distance measuring device 10 to measurement target 60, based on the time from when light is emitted by light emitter 101 to when the light is received by light receiver 102 in the second time period.

Next, distance measuring operations performed by distance measuring device 10 configured as above are described.

Figure 3:
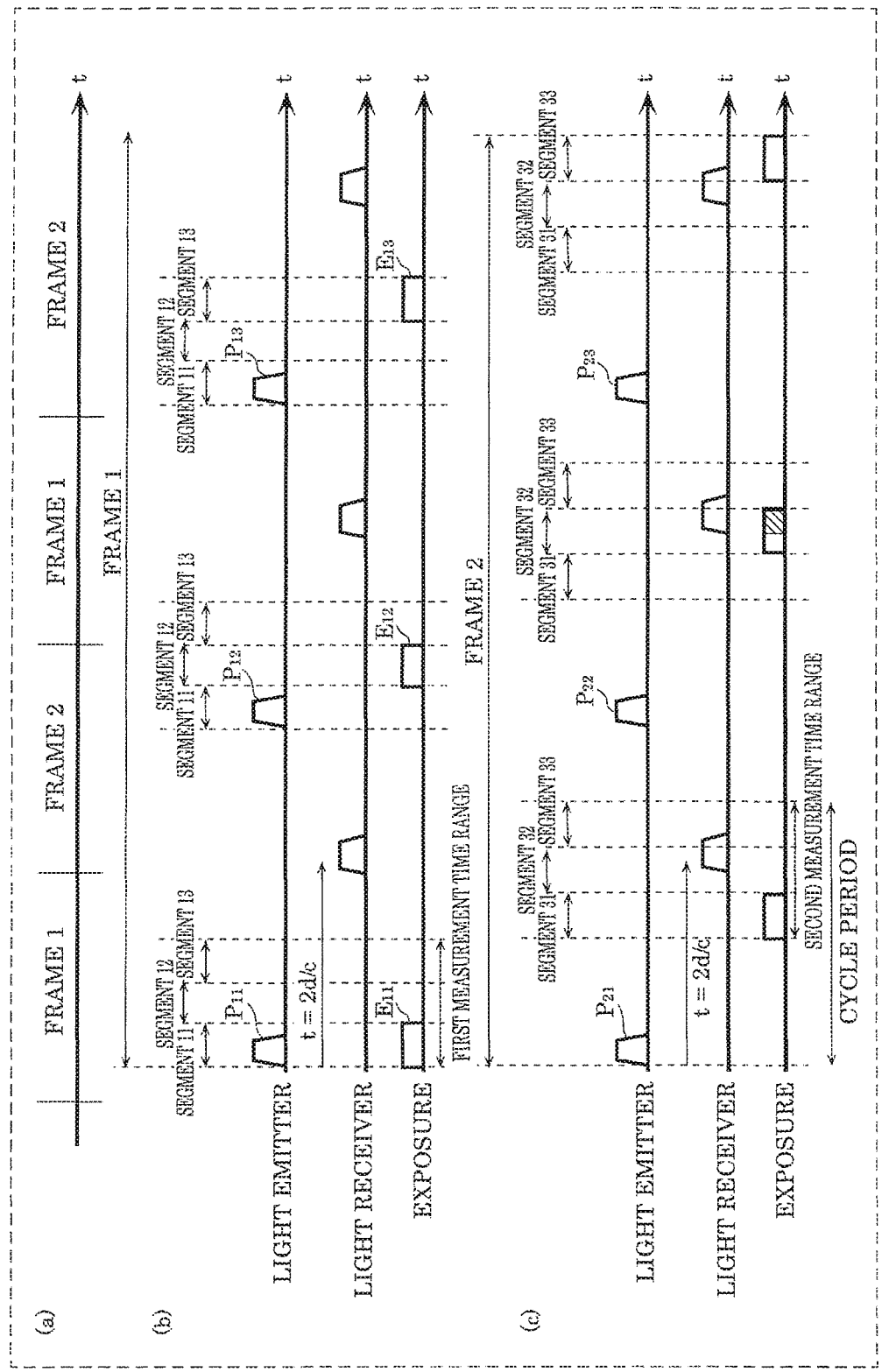
FIG. 3 is a diagram illustrating an example of a sequence of measurement performed by the distance measuring device according to Embodiment 2.

FIG. 3 is a diagram illustrating an example of a sequence of distance measuring operations performed by distance measuring device 10 according to this embodiment. The same elements as in FIG. 2 are assigned the same reference signs, and thus are not described in detail again.

Compared with (a) in FIG. 2 according to Embodiment 1, (a) in FIG. 3 is similar in that measurement operations are performed under measurement conditions different between a first time period and a second time period, but is different in that measurement conditions for the second time period are determined according to the result of the distance measurement operation performed in the first time period.

In FIG. 3, (b) illustrates a case where measurement target 60 was not detected in the first time period. The other operations are the same as described with reference to (b) of FIG. 2, and thus are not explained here.

In FIG. 3, (c) illustrates a case of the second time period in which a measurement operation is performed using a second distance measurement range having an upper limit range indicating a more distant location than the upper limit range of the first measurement distance range in the first time period illustrated in (b) of FIG. 3. More specifically, (c) illustrates a case where a cycle period is repeated three times in the second time period. The cycle period includes three segments (segment 31, segment 32, and segment 33) assuming that N is 3 and also includes time during which light emitter 101 emits pulsed light. Light emitter 101 emits pulsed light ($P_{21}$, $P_{22}$, or $P_{23}$) for each cycle period, and at least one of segments (segment 31, segment 32, and segment 33) of light receiver 102 is in an exposure state for each cycle period.

Although (c) in FIG. 3 illustrates the second measurement time range (time range from segment 31 to 33) that does not include the first measurement time range (time range from segment 11 to 13) used when the distance measurement operation is performed in the first time period, it is to be noted that the second measurement time range may include the first measurement time range used when the distance measurement operation is performed in the first time period. The measurement time range in the second time period may be determined arbitrarily. In particular, time periods are not limited to the first time period and the second time period, and the number of time periods may be plural times including a third time period, a fourth time period, . . . determined arbitrarily. In this case, a method for sequentially increasing a measurement distance range is conceivable.

Figure 4:
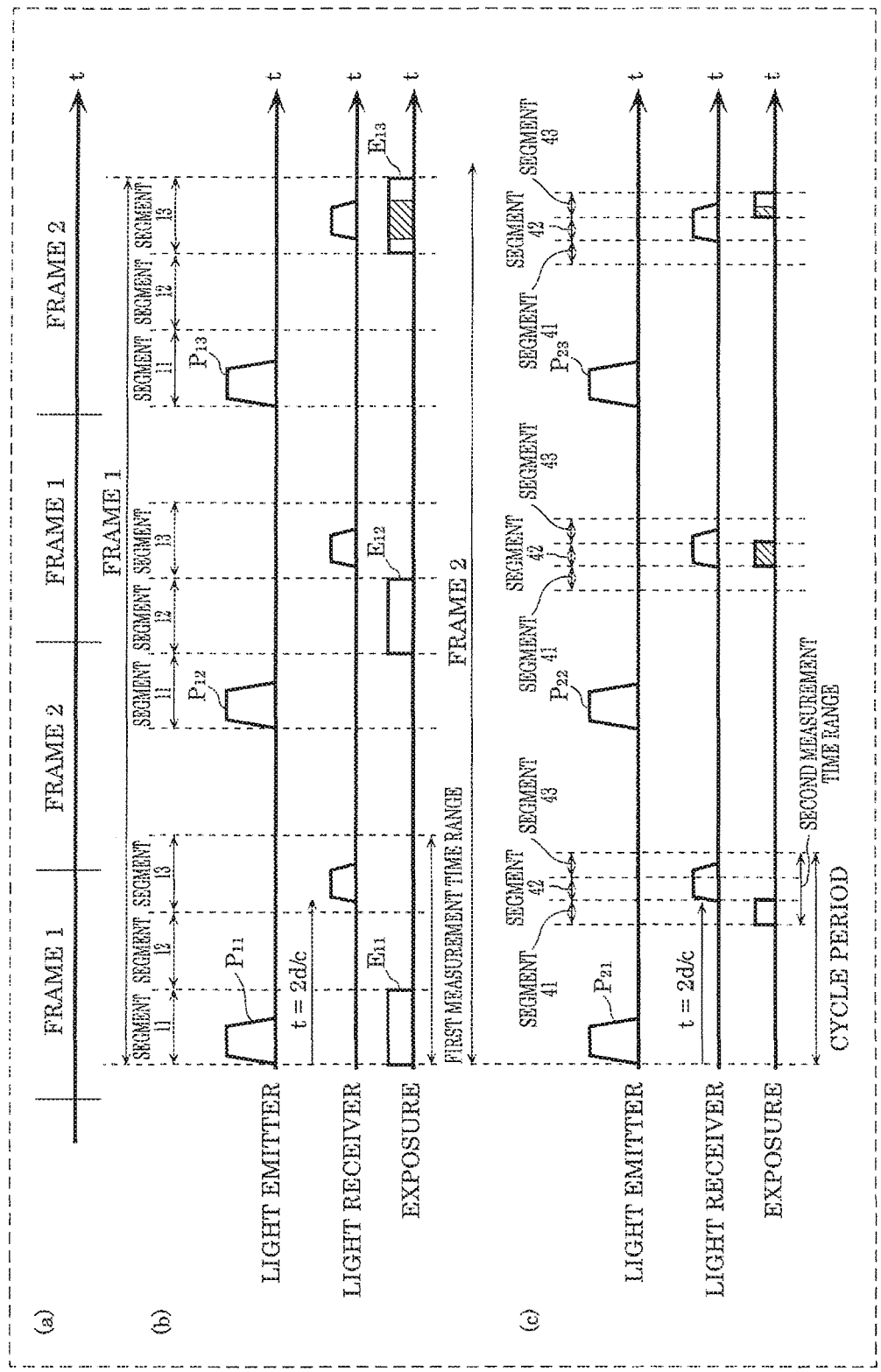
FIG. 4 is a diagram illustrating another example of a sequence of measurement performed by the distance measuring device according to Embodiment 2.

FIG. 4 is a diagram illustrating another example of a sequence of distance measuring operations performed by distance measuring device 10 according to this embodiment. The same elements as in FIGS. 2 and 3 are assigned the same reference signs, and thus are not described in detail again.

In FIG. 4, (b) illustrates a case where measurement target 60 was detected in the first time period. The other operations are the same as described with reference to (b) of FIG. 2, and thus are not explained here.

In FIG. 4, (c) illustrates a case of the second time period in which a measurement operation is performed using a second distance measurement range that is (i) within the segment (segment 13) in which measurement target 60 was detected in the first time period illustrated in (b) of FIG. 4 or (ii) limited to the proximity of the segment. More specifically, (c) illustrates the case where a cycle period is repeated three times in the second time period. The cycle period includes three segments (segment 41, segment 42, and segment 43) assuming that N is 3 and also includes time during which light emitter 101 emits pulsed light. In addition, (c) illustrates the case where light emitter 101 emits pulsed light ($P_{21}$, $P_{22}$, or $P_{23}$) for each cycle period, and at least one of segments (segment 41, segment 42, and segment 43) is in an exposure state for each cycle period.

In other words, in this embodiment, controller 103 determines a second measurement time range according to the result of the distance measuring operation in the first time period. Controller 103 divides the second measurement time range into a plurality of segments and repeats a cycle period plural times, so as to perform a distance measuring operation per segment.

Here, when light receiver 102 detects reflected light in an i-th segment counted from the segment in which pulsed light was emitted in the first time period, controller 103 causes a second measurement time range in which a measurement operation is performed in a second time period to match segment i in which measurement target 60 was detected in the second time period.

In this case, assuming that the first measurement time range is $t_a$, the second measurement time range is $t_b$, the width of the second measurement time range can be represented according to $t_b=t_a/N$. When the second measurement time range is divided by M, and the resulting segments are assigned 1, 2, . . . in time order, the i-th segment among them can be represented according to Expression 5.

[Math. 5]

$$t_j = \frac{t_a(i-1)}{N} + \frac{t_b(j-1)}{M} \sim \frac{t_a(i-1)}{N} + \frac{t_b j}{M} \quad \text{(Expression 5)}$$
$$\approx \frac{t_a}{N}\left(i-1+\frac{j-1}{M}\right) \sim \frac{t_a}{N}\left(i-1+\frac{j}{M}\right)$$

According to Expression 5, the measurement resolution when the second measurement time range tb is equally divided into M segments is $t_a/MN$ which is 1/M times compared to the case of the first measurement time range $t_a/N$ which is the distance resolution in the first time period, and which results in increase in the distance resolution.

Figure 5:
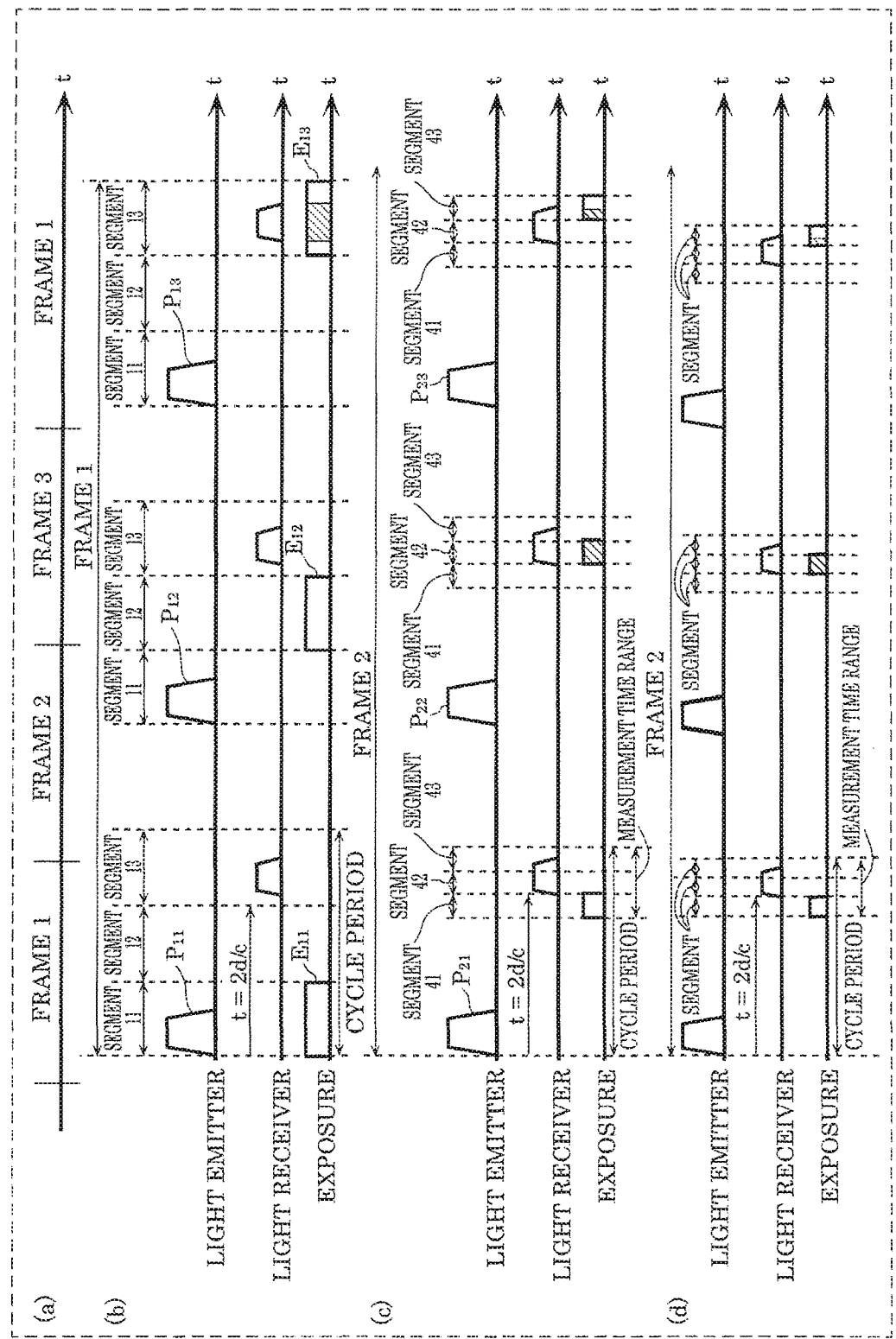
FIG. 5 is a diagram illustrating another example of a sequence of distance measuring operations performed by the distance measuring device according to Embodiment 2.

It is to be noted that the method for dividing the first measurement time range and the second measurement time range is not limited to a method for dividing them at equal intervals, and can be determined arbitrarily also in this embodiment. As illustrated in FIG. 5, a measurement resolution may be increased by sequentially reducing a measurement time range with reference to the result of a previous time period in the same manner also in a third time period and the following time periods. Here, FIG. 5 is a diagram illustrating an example of another sequence of distance measuring operations performed by distance measuring device 10 according to this embodiment. The same elements as in FIG. 4 are assigned the same reference signs, and thus are not described in detail again.

It is to be noted that the measurement time range is desirably the same as the segment in which a measurement target was detected in the previous time period, but a time range wider than the segment may be selected.

There is no need to always reduce a measurement time range sequentially. For example, a time period for performing measurement at a low resolution in a wide measurement time range may be added between measurement in small measurement time ranges. The method has an advantage of being able to measure the distance to the measurement target in the large measurement time range even if an object abruptly enters outside the measurement time range for distance measuring device 10.

As a special example in this embodiment, there is a case where K=1 is satisfied. In this case, only the presence/absence of a measurement target is checked in a first time period, and only when a measurement target is detected, distance measurement is performed in a second time period.

When a distance measuring operation is desired to be performed at a measurement resolution higher than the width of a light pulse, a method including the following processes is conceivable: setting an exposure time width to be approximately smaller than or equal to the width of the light pulse; changing exposure start time by dividing it by a width smaller than the width of the light pulse; and regarding the exposure start time at which the intensity of the detected reflected light is the maximum to be the distance to measurement target 60. In this case, both of the distance and luminance need to be measured, and thus a circuit illustrated in FIG. 10 to be described later may be used.

In addition, when light receiver 102 is configured using an image sensor, it is possible to configure a two-dimensional distance data group, and thus to obtain a distance image. In this case, there is a possibility that a plural number of measurement targets (measurement targets 60) are detected in a single distance measurement process. In this case, a plurality of measurement time ranges need to be selected in a second time period. In other words, in this case, measurement in measurement time range 1 in which measurement target 1 is present, measurement time range 2 in which measurement target 2 is present, . . . may be performed all at once. However, when there are many measurement targets, long measurement time may be required. In order to prevent this, for example, measurement under the same measurement conditions as those for the first time period may be performed between the measurement in measurement time range 1 in which measurement target 1 is present and the measurement in measurement time range 2 in which measurement target 2 is present. Targets for which measurement for increasing a resolution in distance measurement may be limited using, for example, a method for determining the target using an algorithm, or a method in which a user arbitrarily determines the target. For example, measurement with a high distance resolution is performed on a human or an animal, but is not performed on a house, wall, signboard, or the like. Methods for limiting targets are not limited thereto.

When light receiver 102 includes a plurality of distance measuring devices arranged two-dimensionally, and is capable of outputting a distance image, it is also possible to use a method of integrating the results of measurement by the plurality of distance measuring devices, calculating the sum, average, dispersion, etc. of the number of incident photons, and, when there is a significant difference from background light, determining that the photons were detected. The flow of measurement in this case is described below with reference to the drawings.

Figure 6A:
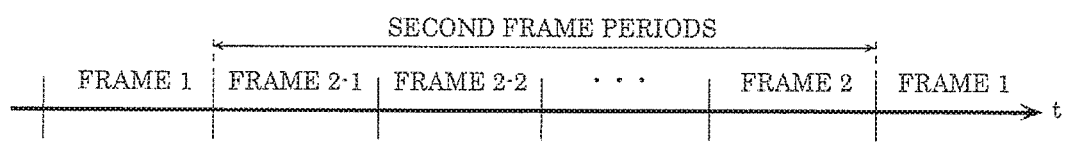
FIG. 6A is a diagram illustrating another example of a sequence of distance measuring operations performed by the distance measuring device according to Embodiment 2.
Figure 6B:
FIG. 6B is a diagram illustrating another example of a sequence of distance measuring operations performed by the distance measuring device according to Embodiment 2.
Figure 6C:
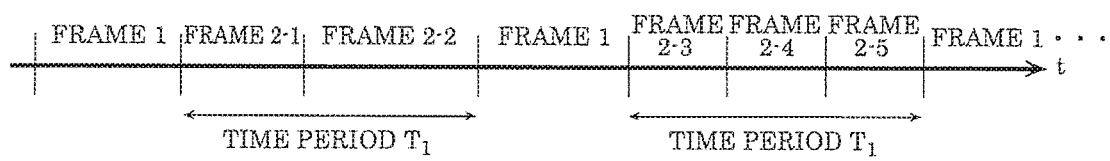
FIG. 6C is a diagram illustrating another example of a sequence of distance measuring operations performed by the distance measuring device according to Embodiment 2.

FIGS. 6A, 6B, and 6C are each a diagram illustrating an example of another sequence of distance measuring operations performed by distance measuring device 10 according to this embodiment.

For example, FIG. 6A illustrates a case where a distance measuring operation using a low measurement resolution is performed in a first time period, and then in a second time period, a distance measuring operation using a distance measurement resolution higher than the one in the first time period is performed n times. More specifically, it is assumed that distance measuring device 10 performs a distance measuring operation using the low measurement resolution in the first time period, and detects that objects 1, 2, 3, . . . are located at distances z1, z2, z3, zn, . . . as a result of calculation. In this case, distance measuring device 10 performs distance measuring operations for respective objects 1, 2, 3, . . . which are located at distances z1, z2, z3, zn, . . . in period 2-1, period 2-2, . . . period 2-n each having a resolution higher than the resolution in the first time period.

It is to be noted that the proceeding of time periods is not limited to the case illustrated in FIG. 6A. As illustrated in FIG. 6B, it is also possible to perform distance measuring operations by alternately proceeding a first time period with a low measurement resolution and a second time period with a high distance resolution, for example, in the order of a first time period, a 2-1 time period, a first time period, a 2-2 time period, . . . .

Alternatively, not only proceeding first time periods with a high measurement resolution and second time periods with a low measurement resolution at a ratio of 1:1 as illustrated in FIG. 6B, time periods may be proceeded at an arbitrary ratio of 1:2 for example.

In addition, time in which a plurality of second time periods are performed may be set in advance as illustrated in FIG. 6C in which a second time period with a high distance measurement resolution is performed repeatedly. It is to be noted that proceeding of time periods is not limited to these examples as a matter of course.

Embodiment 3

A case where distance measuring device 10 and measurement target 60 have motions, for example, by moving is not mentioned in Embodiments 1 and 2. In this embodiment, a case where one of distance measuring device 10 and measurement target 60 is moving is described focusing on differences from Embodiments 1 and 2.

Distance measuring device 10 according to this embodiment is different from distance measuring device 10 according to Embodiments 1 and 2 in operation details of controller 103 and distance calculator 105.

It is assumed that controller 103 confirms that measurement target 60 from which light receiver 102 received reflected light is present in the N-th segment (N is a natural number larger than or equal to K'(M)) among K'(M) segments. In this case, controller 103 performs control of: dividing, into O segments (O is a natural number larger than or equal to 2), a third measurement time range which includes the N-th segment and is smaller than a second measurement time range used in a second time period; repeating, O times, a third cycle period including time during which light emitter 101 emits emission light and the third measurement time range; and placing light receiver 102 into an exposure state in at least one of the O segments for each third cycle period.

Distance calculator 105 may calculate the distance from distance measuring device 10 to measurement target 60, based on the time from when light is emitted by light emitter 101 to when the light is received by light receiver 102 in the third time period.

Furthermore, when controller 103 confirms that light receiver 102 received the reflected light and measurement target 60 is present in a P-th segment (P is a natural number smaller than or equal to O) among O segments, distance calculator 105 may calculate a distance difference which is the difference between the distance calculated in the third time period and the distance calculated in the second time period. Distance calculator 105 may calculate the ratio between the calculated difference distance and time from start time of the N-th segment in the second time period to start time of the P-th segment in the third time period, and, based on the ratio, calculate a velocity of distance measuring device 10 in a direction of travel of the emission light. Although the start time of the N-th segment and the start time of the P-th segment are used here, other characteristic times of the N-th segment and the P-th segment may be used. For example, the end time of the N-th segment and the end time of the P-th segment may be used.

Here, controller 103 can predict a distance range for measurement target 60 in a fourth time period by adding a distance value to the distance calculated in the third time period. The distance value is obtained by multiplying the velocity and time from the start time of the third time period to the start time of the fourth time period. For this reason, controller 103 performs control of: determining a fourth measurement time range which includes a measurement time range corresponding to a predicted distance range and is smaller than the third measurement time range; dividing the fourth measurement time range into a plurality of segments as in the above-described distance measurement; repeating, plural times, a fourth cycle period which includes time during which light emitter 101 emits emission light and the fourth measurement time range; and placing light receiver 102 into an exposure state in at least one of the plurality of segments for each fourth cycle period.

Next, distance measuring operations performed by distance measuring device 10 according to this embodiment configured as above are described.

Figure 7:
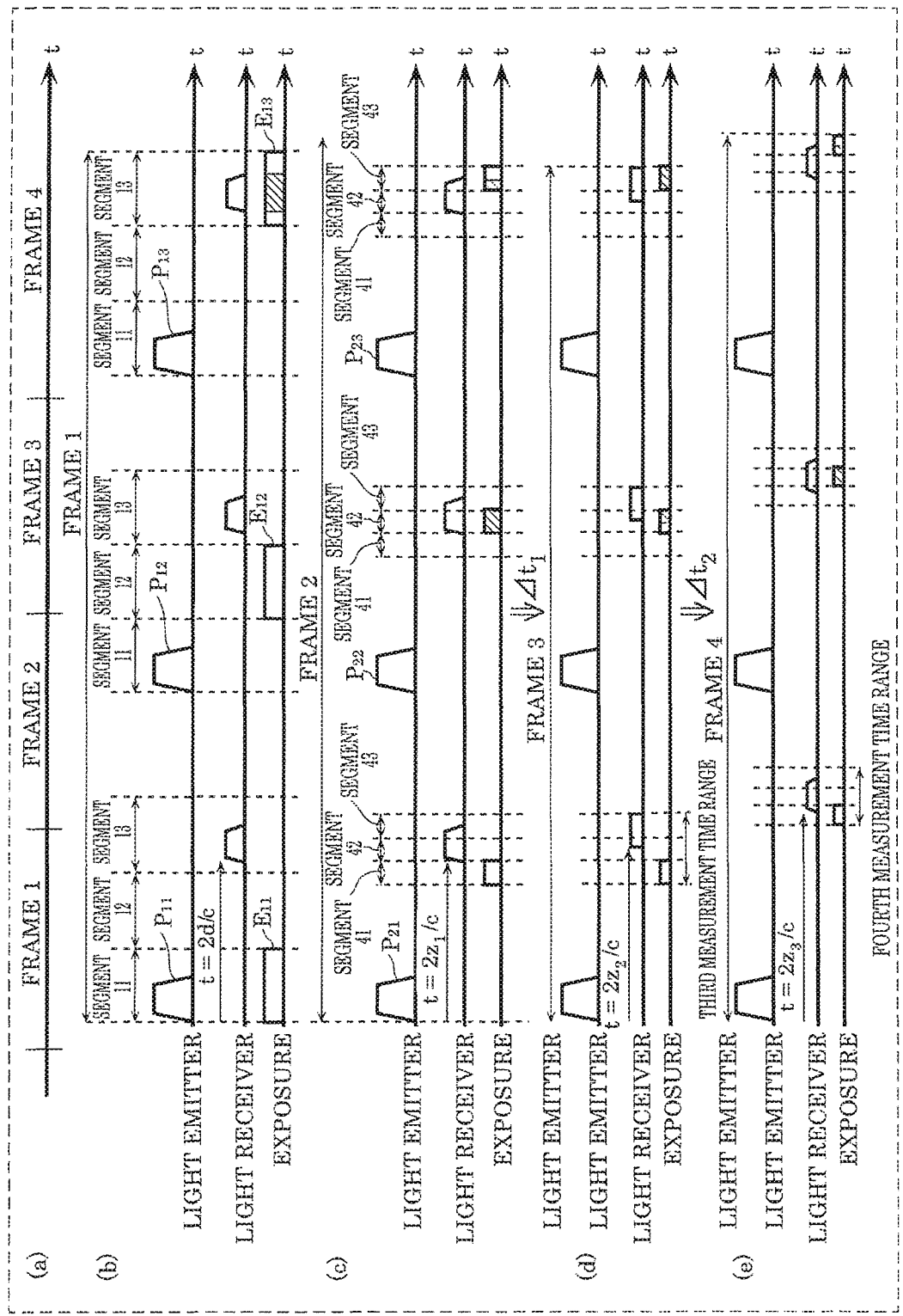
FIG. 7 is a diagram illustrating an example of a sequence of distance measuring operations performed by the distance measuring device according to Embodiment 3.

FIG. 7 is a diagram illustrating an example of a sequence of distance measuring operations performed by distance measuring device 10 according to this embodiment. The same elements as in FIG. 4 are assigned the same reference signs, and thus are not described in detail again.

In this embodiment, as illustrated in (a) of FIG. 7, measurement operations performed four times in total in a first time period, a second time period, a third time period, and a fourth time period are regarded as a group. Since (b) and (c) of FIG. 7 are the same as (b) and (c) of FIG. 4, no overlapping descriptions are provided.

In the third time period illustrated in (c) of FIG. 7, distance measurement with a distance resolution higher than or equal to the distance resolution in the second time period is performed. Details of the operation are as described with reference to (c) of FIG. 4, and thus are not explained here.

It is assumed that the distance to measurement target 60 obtained by controller 103 in the second time period is z1, and the distance to measurement target 60 obtained by controller 103 in the third time period is z2. It is also assumed that time from when measurement target 60 was detected in the second time period to when measurement target 60 was detected in the third time period is Δt1. In this case, controller 103 can calculate velocity v1 in the distance direction of measurement target 60 according to Expression 6.

[Math. 6]

$$v_1 = \frac{z_2 - z_1}{\Delta t_1} \quad \text{(Expression 6)}$$

Controller 103 may calculate, in the fourth time period, velocity v2 in the distance direction of measurement target 60 from the third time period to the fourth time period. Controller 103 may calculate acceleration a1 of measurement target 60 using velocities v1 and v2 and time Δt2 which is time from when measurement target 60 was detected in the third time period to when measurement target 60 was detected in the fourth time period, according to Expression 7.

[Math. 7]

$$a_1 = \frac{v_2 - v_1}{\Delta t_2} \quad \text{(Expression 7)}$$

In the fourth time period illustrated in (e) of FIG. 7, controller 103 predicts the distance (location) of measurement target 60 in the fourth time period using velocity v1 of measurement target 60 obtained in the third time period illustrated in (d) of FIG. 7, and determines the fourth measurement distance range including the predicted distance (location). In this way, distance measuring device 10 is capable of increasing a measurement resolution by dividing the fourth measurement distance range including the distance to (location of) measurement target 60 in the fourth time period, and thus can further increase measurement accuracy.

This is described in detail below. It is assumed that: a distance to measurement target 60 and velocity of measurement target 60 obtained in a third time period are denoted as z2 and v1; and time from a representative point of time in the third time period to a representative point of time in the fourth time period is denoted as Δt2. In this case, controller 103 is capable of predicting the location of measurement target 60 which is present in the fourth time period according to Expression 8.

[Math. 8]

$$z_3 = z_2 + v_1 \cdot \Delta t_2 \quad \text{(Expression 8)}$$

For this reason, controller 103 can perform a distance measuring operation in a range limited to the proximity of the location predicted as being the location at which measurement target 60 is present in the fourth time period, and can calculate the distance to measurement target 60 at a higher resolution and a fewer number of times of measurement. By repeatedly performing this method in this time period and the following time periods, it is possible to sequentially increase the accuracies in distance measurement.

For example, a conceivable use application for recognizing a human or an animal is an image sensor configured to include light receiving elements arranged in a two-dimensional array and further include an optical system as necessary, so as to be capable of measuring two-dimensional distance data that is a distance image, and recognizing a human or an animal. This application requires the following performance when distance measuring device 10 is mounted on a vehicle which runs an open road at a speed of 60 km per hour and a human or an animal is desired to be recognized. When capturing a video at 30 fps which is a frame rate for general video, the distance between the human and the device changes by 0.6 m according to 60×($1000/3600$)×($1/30$) in one frame.

A human or an animal has a thickness of approximately 0.2 m, and thus when the human or the animal is desired to be recognized, a required measurement resolution is approximately 0.1 m which is half of the thickness thereof. When a distance range corresponding to one segment is 0.1 m, in order to allow distance measuring device 10 to keep performing a distance measuring operation without losing track of measurement target 60, the number of segments in the measurement time range needs to be at least six so as to include 0.6 m corresponding to a distance change. When the vehicle is running at 60 km/h, the stopping distance is approximately 35 m. In order to recognize the human and stop with a margin, there is a need to capture a distance image of a location ahead by approximately 100 m which is approximately three times of 35 m. Here, a conceivable laser light source which is used as light emitter 101 is of class 1, and has an intensity of approximately 1 mW and an irradiation angle of 10 degrees. In order to recognize the human, the image sensor needs to have a resolution of approximately 0.1 m in the horizontal and vertical directions. Thus, the lens of the image sensor is designed to have a focal length that provides such a resolution and a lens diameter of approximately 1 cm. It is also assumed that measurement target 60 has a reflection rate of 0.1. When the wavelength of a light pulse which is emitted by the laser light source is 860 nm, the number of photons of the light pulse is approximately $4 \times 10^{15}$ per second, and thus the number of photons of the reflected light is calculated to be approximately $1 \times 10^3$ per second. For this reason, when the image sensor has a quantum efficiency of 60%, it takes approximately 2 ms to detect that one photon returned to the sensor, and thus it takes 12 ms as measurement time when measurement is performed six times. Since the frame rate of general video is 30 fps, one frame needs to be 30 ms or below. Therefore, it is impossible to recognize three or more humans or animals in the above-described distance measuring operation, and output the result as an image.

Even in such a case, the use of the measuring method according to this embodiment substantially removes the lower limit of the number of segments in each time period, and makes it possible to reliably catch a moving measurement target in a single measurement process. In this way, the measurement time becomes at most $1/6$ times in the above example, which makes it possible to catch approximately 10 measurement targets at a high distance resolution. For this reason, for example, it is possible to expect an effect in applications such as recognition of a distant object in an on-vehicle application.

In this embodiment, a distance measuring device may be used. The distance measuring device may be configured to include light receiver 102 having distance measuring devices arranged in a two-dimensional array and further include an optical system configured using a lens etc. as necessary, so as to be capable of measuring a two-dimensional image of distance measurement data. At this time, a light receiving element without any optical system is referred to as an image sensor, and each of elements capable of independently outputting a measurement result is referred to as a pixel. In this case, it is also possible to obtain each of a distance image in which distance data are arranged two-dimensionally and a luminance image in which luminance data are arranged two-dimensionally. In addition, a possible configuration is a configuration which enables recognition of measurement target 60 using a method in which a distance image is subjected to recognition processing at a later stage.

Figure 12:
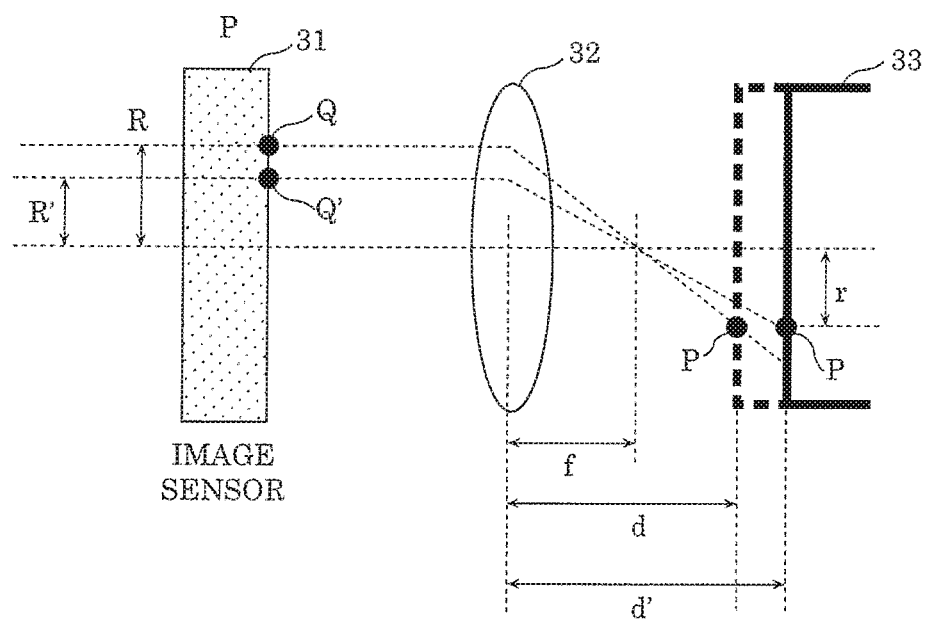
FIG. 12 is a diagram for explaining the relationship between (i) a distance between an image sensor according to Example 2 of Embodiment 6 and an object and (ii) an image in the image sensor.

FIG. 12 is a diagram for illustrating a relationship of the image position of point P in a measurement target in image sensor 31 with respect to the distance between image sensor 31 and target 33 according to this embodiment.

It is assumed that light reflected at point P distant by distance r from the optical axis of lens 32 on target 33 distant by distance d from image sensor 31 enters point Q which is distant by distance R from the optical lens of lens 32 and on image sensor 31. When the distance between image sensor 31 and target 33 changes to d' in the next distance measurement time, distance R' between the point on image sensor 31 onto which the light reflected on point P is incident and the optical axis of lens 32 is represented according to Expression 9.

[Math. 9]

$$R' = \frac{d-f}{d'-f}R \quad \text{(Expression 9)}$$

According to Expression 9, it is possible to predict, in image sensor 31, a region in which the measurement target appears in the next frame.

In this case, it is possible to limit the region to be subjected to image recognition processing to the proximity of the measurement target, which allows reduction in time required for the image recognition processing.

A velocity $(V_x, V_y)$ of measurement target 60 in an image can be calculated by: calculating differences $(\Delta x, \Delta y)$ of the position (x, y) in the vertical and horizontal directions of measurement target 60 in the image; dividing the differences $(\Delta x, \Delta y)$ by $\Delta t$ which is a difference in characteristic time between the measurements, according to $(V_x, V_y)=(\Delta x/\Delta t, \Delta y/\Delta t)$. Thus, the region to be subjected to image recognition processing may be determined by predicting a region in which measurement target 60 is present in the next distance measurement.

In addition, when distance measuring device 10 is moving, the velocity of distance measuring device 10 can be calculated by performing velocity measurement described in this embodiment. A still object is registered in advance in a camera system. Non-limiting examples of a still object include a wall, a building, and a road sign.

When velocity vst of the still object is calculated, velocity vst is a relative velocity between the still object and distance measuring device 10, and the absolute velocity of the still object is 0 m/s, and thus the velocity obtained by multiplying relative velocity vst with −1 is travel velocity V of distance measuring device 10.

[Math. 10]

$$V = -V_{st} \quad \text{(Expression 10)}$$

Figure 13:
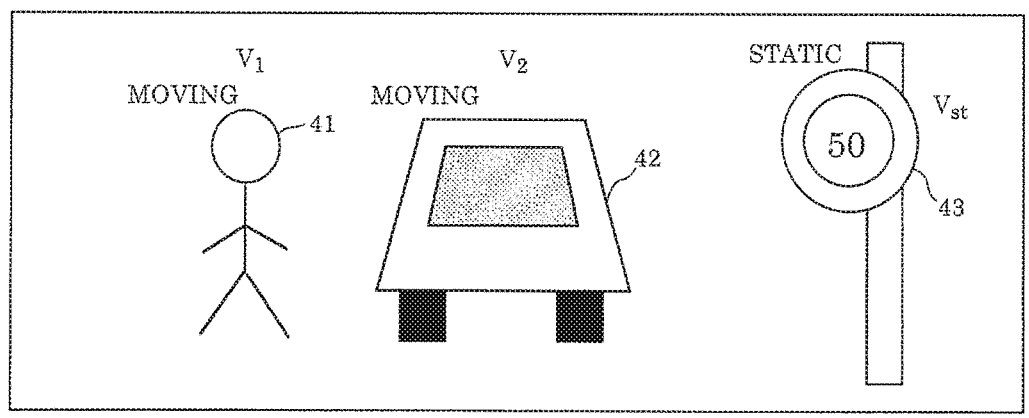
FIG. 13 illustrates examples of distance images to be measured by the distance measuring device according to Example 2 of Embodiment 6.

FIG. 13 illustrates examples of distance images to be measured by distance measuring device 10. FIG. 13 illustrates object 41 which is for example a human, object 42 which is for example a vehicle, and object 43 which is for example a signboard. Distance measuring device 10 including image sensor 31 is capable of recognizing a still signboard (object 43) from among three measurement targets 60 which are the human (object 41), the vehicle (object 42), and the signboard (object 43) illustrated in FIG. 12, and calculating the velocity of distance measuring device 10 based on the relative velocity.

For example, when distance measuring device 10 according to this example is used in on-vehicle application, measurement conditions need to be changed depending on a vehicle speed. For example, distance measurement is desired to be performed in a range including a distant location when a vehicle speed is high, but only in a nearby range when a vehicle speed is low. For this reason, distance measuring device 10 is capable of sequentially performing distance measurement while changing measurement conditions by recognizing the speed thereof and feeding back the measurement result.

In the case of on-vehicle application, although communication between a speed meter and distance measuring device 10 can be performed, it is possible to configure a robust system for allowing distance measuring device 10 to independently keep performing a distance measuring operation even when abrupt delay occurs in the communication or the communication is abruptly disconnected.

In addition, when the speed meter does not operate correctly in the case of slipping or the like even when the communication between the camera system and the speed meter is normally performed, it is possible to provide the speed meter with the velocity calculated by distance measuring device 10 and display the correct vehicle speed.

Embodiment 4

Embodiments 2 and 3 each describes the non-limiting case where the measurement conditions in the second time period are determined according to the result of the distance measuring operation performed in the first time period. It is also advantageous to use a distance obtaining method in which measurement in a second time period is performed without referring to the result in a first time period and the measurement results of the two time periods are subjected to data processing. This case is described below as Embodiment 4 focusing on differences from Embodiment 1.

Distance measuring device 10 according to this embodiment is different from distance measuring device 10 according to Embodiment 1 in operation details of controller 103.

More specifically, controller 103 provides, in the second time period, a second cycle period which is smaller than a first measurement time range and the same as the time width of a segment in which measurement target 60 is detected among K segments. Controller 103 performs control for causing light emitter 101 to emit emission light in the same cycle period as the second cycle period and placing light receiver 102 into an exposure state in one of the M (M is a natural number larger than or equal to 2) segments obtained by dividing the second cycle period. In particular, although the lower limit for the time width of the cycle period is defined as time required for full attenuation so that reflected light in a certain cycle period is not erroneously detected in another cycle period in Embodiments 1 to 3, such a lower limit is not defined in this embodiment.

Controller 103 performs AND processing on the respective results in the first and second time periods so as to cause distance calculator 105 to measure (calculate) the distance to measurement target 60.

The principle of this embodiment is indicated below. First, a distance is determined at a resolution represented according to Expression 4 in the first time period. In the second time period, an exposure time width is set to 1/M of the segment width in the first time period, and thus a distance resolution is also 1/M. It is assumed in the second time period that light emission is performed in an emission cycle shorter than attenuation time of a light pulse. Thus, it is impossible to determine a one-to-one relationship between an emission light pulse and a received light pulse, and a periodic folding at an integer multiple of light emission cycle $T_d$ needs to be considered. In other words, when pulsed light is detected in a j-th segment among M segments, distance data is represented according to following Expression 11 where the time width of a cycle period is $T_d$.

$$t = (j-1)T_d/M + kT_d - jT_d/M + kT_d \quad \text{(Expression 11)}$$

Here, k is an unknown integer larger than or equal to 0, and $kT_d$ corresponds to a folding component of the time width of a cycle period is $T_d$. Since the distance can be uniquely determined at the resolution $T_d$ according to Expression 4, it is possible to uniquely determine unknown integer k in the result obtained according to Expression 11, and to determine the position of a measurement target at a resolution $T_d/M$.

A description is given of a driving method (distance measuring operation) for light emission and exposure in distance measurement performed by distance measuring device 10 according to this embodiment configured as described above.

Figure 8:
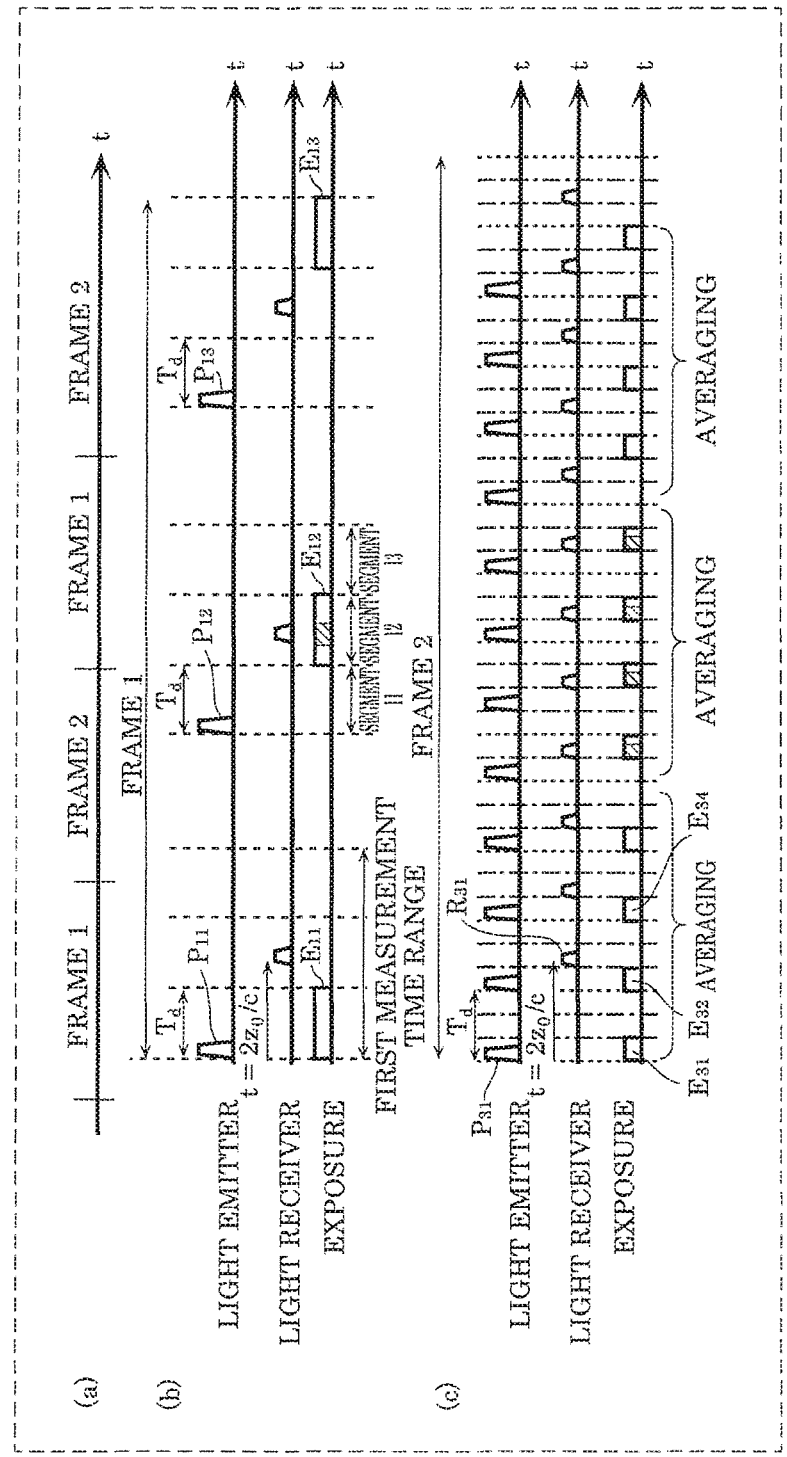
FIG. 8 is a diagram illustrating an example of a sequence of distance measuring operations performed by the distance measuring device according to Embodiment 4.
Figure 9:
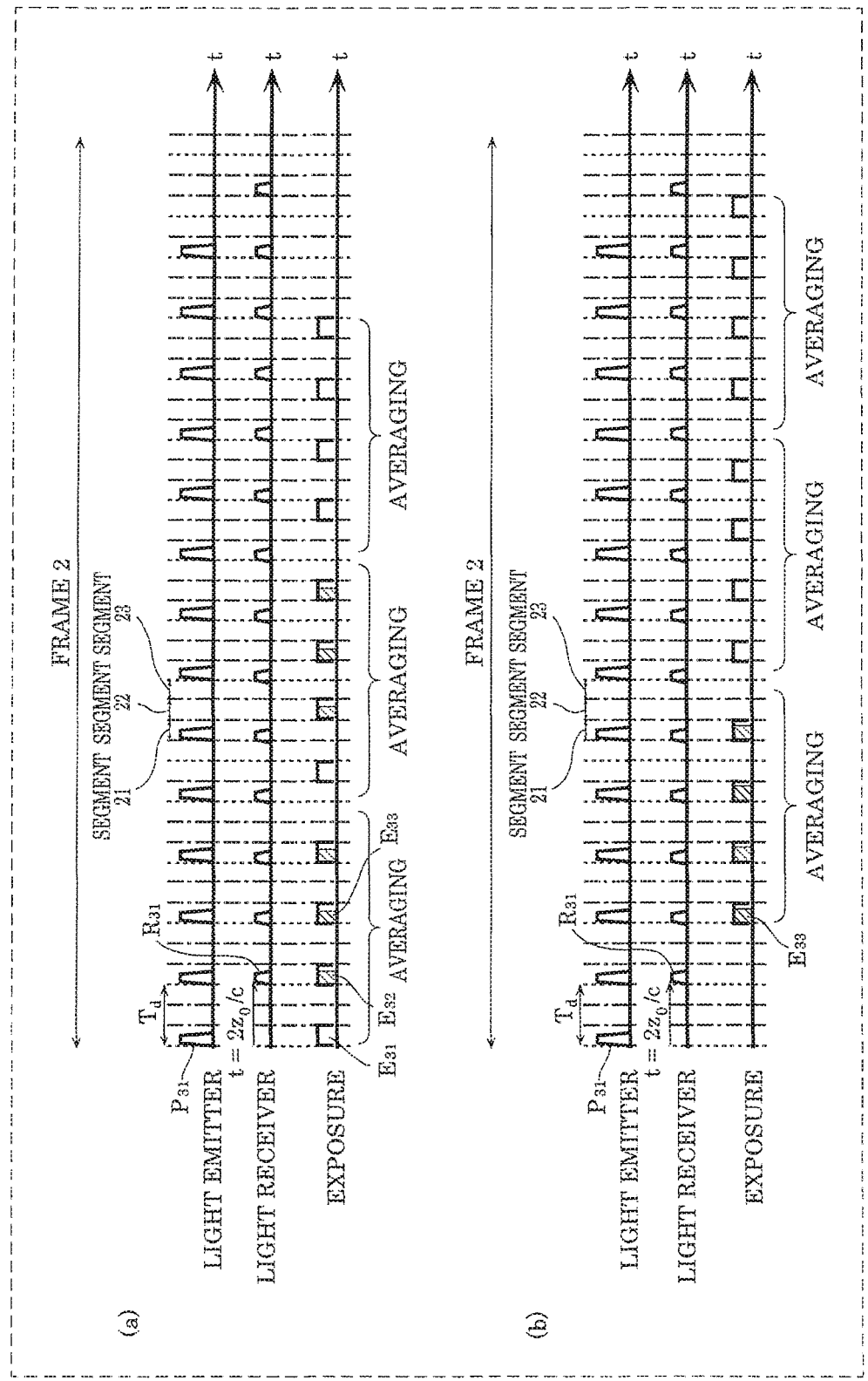
FIG. 9 is a diagram illustrating an example of a sequence of distance measuring operations performed by the distance measuring device according to Embodiment 4.

FIGS. 8 and 9 are each a diagram illustrating an example of a sequence of distance measuring operations performed by distance measuring device 10 according to this embodiment. The same elements as in FIG. 2 are assigned the same reference signs, and thus are not described in detail again.

In FIG. 8, (b) illustrates a case where measurement target 60 was detected in segment 12 in the first time period. At this time, the return timing of reflected light is limited to the range of $t=T_d$ to $2T_d$. The other operations are the same as described with reference to (b) of FIG. 2, and thus are not explained here.

In the second time period illustrated in (c) of FIG. 8, controller 103 causes light emitter 101 to emit a light pulse at a cycle of the same time $T_d$ as in a first segment (segment 12, segment 13, or segment 14) in a first measurement time range. In addition, in the second time period, controller 103 performs control for placing light receiver 102 into an exposure state in one of the three segments (second segment) obtained by dividing the cycle period by 3. It is to be noted that (c) of FIG. 8 illustrates an example of driving for integration. AVERAGING in the diagram corresponds to a single integration process. As a matter of course, only one light pulse may be output per one segment without performing integration. When performing integration, a distance is calculated using an average value or a sum. In FIG. 8, (c) illustrates an example where reflected light returns in a second segment in a second time period. According to Expression 12, in this case, the return timing of the pulsed light is known as $t=T_d/3+kT_d$ to $2T_d/3+kT_d$. As described above, through the measurement in the first time period, the return timing of the reflected light can be uniquely determined according to $t=4T_d/3$ to $5T_d/3$ because t ranges from $T_d$ to $2T_d$, and thus k is 1.

In particular, the driving method has an advantage of being able to perform measurement in a second time period without referring to distance data in a first time period, and to determine distance data by performing arithmetic processing at a later stage. The driving method does not require judgment on whether a measurement target was detected or not and time for recognition processing, which enables reduction in measurement time. In particular, when a distance measuring device array having a high integration of approximately $10^6$ such as a general image sensor is used, it takes several ms to perform recognition processing and this can limit a frame rate. However, the present distance measuring method does not require time for recognition processing, and thus can reduce measurement time by the time for recognition processing. The measuring method described in this embodiment provides the following two advantageous effects of: 1. increasing efficiency of long-distance distance measurement; and 2. measuring a plurality of objects with high accuracy in measurement of a distance image. These advantageous effects are described below taking examples.

1. Increasing efficiency of long-distance distance measurement is described. The number of times of integration increases in distance measurement in a range including a distant location because the number of photons that were reflected by a measurement target and returns decreases. For this reason, it is important to shorten the cycle of an emission light pulse, and to increase the number of times of integration. As an example, a state where distance measurement is performed in a range including a location distant by 250 m using a distance imaging device. For example, when the distance to a measurement target at a location distant by 250 m or more is measured using (i) a light pulse source that has a pulse intensity of 20 W, a light pulse width of 100 ns, an output angle of approximately 10 degrees, (ii) a light receiver that has a quantum efficiency of 60% and a light receiver area of 10 μm, and (iii) a lens of F=2, one photon stemming from one light pulse returns to the light receiver, and the photoelectric conversion probability is 1/2000 or less, and thus approximately at least 2000 times of integration is required. In the case of Embodiments 1 to 3, the lower limit for a cycle period is set to 1.6 μs because approximately 1.6 μs is required by the time when a light pulse is reflected by a measurement target at a location distant by 250 m and returns to the light receiver. Thus, when a light pulse is output 2000 times, it takes 4 ms to perform measurement in one segment.

In the case of using the measuring method by distance measuring device 10 according to this embodiment, when an interval width of a measurement distance range is set to 10 m in a first time period, the cycle for emitting a light pulse in a second time period is approximately 0.06 μs which is 1/25 times, and thus it takes 0.12 ms when pulse emission is performed 2000 times. This time is ignorable because it is 1/400 times of 30 ms of a frame in the case of a general frame rate of 30 fps for video.

Figure 21:
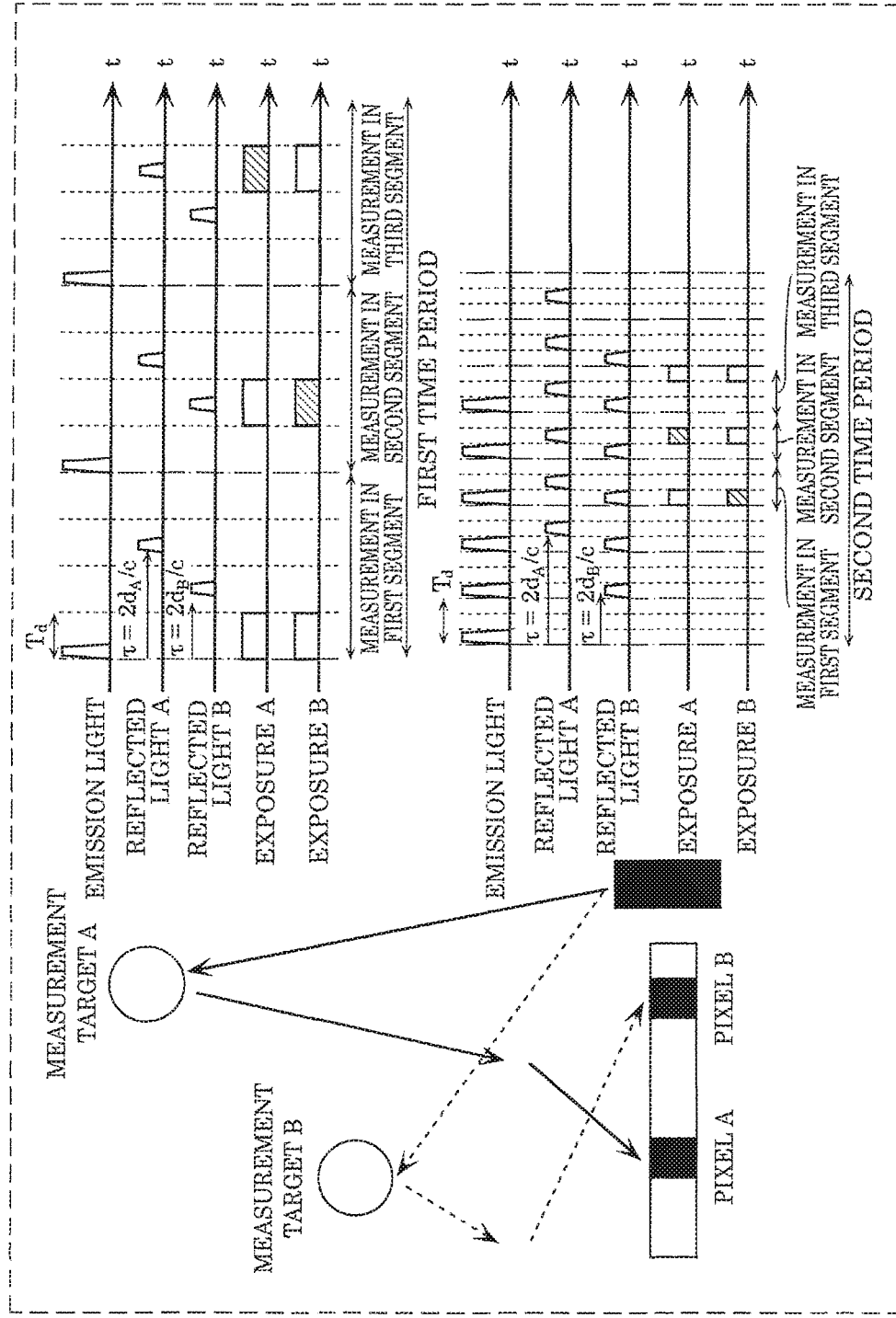
FIG. 21 is a diagram for explaining that it is possible to obtain different results according to the distances to measurement targets by performing same exposure sequences for all pixels according to Embodiment 4.

2. Measuring a plurality of objects with high accuracy in measurement of a distance image is described below. Here, a distance image is two-dimensional distance data group that is output from a measurement device system that includes distance measuring devices arranged in a two-dimensional array, and, as necessary, an optical system such as a lens. In Embodiment 2, when a plurality of measurement targets are present, timings for detecting reflected light by corresponding pixels are different depending on the distances to the respective measurement targets, which requires that measurement needs to be performed separately with high resolutions for all of the measurement targets. In this embodiment, however, it is possible to obtain different results according to the distances to measurement targets by performing the same sequence of exposure for all of the pixels. This is explained with reference to FIG. 21. As for pixel A which detects measurement target A and pixel B which detects measurement target B, emission light, reflected light, and exposure sequences are illustrated. The emission light is the same, and the exposure timings for pixel A and pixel B are also the same. In a first time period, pixel A detects light in a third segment and pixel B detects light in a second segment; and in a second time period, pixel A detects light in a second segment, and pixel B detects light in a first segment. In this way, the single measurement process shows that light reflected from measurement target A returns in time $t=7T_d/3$ to $8T_d/3$, and light reflected from measurement target B returns in time $t=4T_d/3$ to $5T_d/3$.

Here, the first time period and the second time period may be performed in random order. As a matter of course, a third time period, a fourth time period, . . . may be added and operations for sequentially increasing a current resolution may be performed.

In addition, since it takes time from emission of a light pulse to return of reflected light, it is desirable that first exposure in the second time period is started at time by which a first pulsed light surely returns. For example, in the second time period illustrated in (a) of FIG. 9, reflected light $R_{31}$ of first light pulse $P_{31}$ has not yet returned in first exposure time $E_{31}$, and thus exposure time $E_{31}$ is wasteful. Since light detection is performed only three times although light detection should be performed four times in the integration, the possibility of a loss of light detection increases.

Such a loss of light detection can be prevented by setting the first exposure start time in the second time period to time at or after the start time of the last segment in the first measurement time range in the first time period as illustrated in (b) of FIG. 9. In other words, it is only necessary that the first exposure in the second time period is started at exposure time $E_{33}$. This makes the number of times of pulse emission larger than the number of times of exposure as in the second time period illustrated in (b) of FIG. 9, and involves disadvantages of increase in power consumption and measurement time. However, when distance measurement is performed in a range including a distant location that is, for example, distant by 250 m, pulse emission needs to be performed a thousand times or more, and the increase in the number of times of pulse emission is at most ten times that is approximately equal to the number of segments in the first measurement, and thus the increase is merely 1%.

Embodiment 5

In Embodiments 1 to 4, methods for determining the distance to measurement target 60 are the same, but may be changed to different methods. This case is explained in Embodiment 5 below.

Distance measuring device 10 according to this embodiment is different from distance measuring device 10 according to Embodiments 1 to 4 in operation details of controller 103. Hereinafter, differences from Embodiments 1 to 4 are mainly explained.

Specifically, controller 103 divides a measurement time range into K (K is a natural number greater than or equal to 1) segment(s) in a first time period and a second time period, and repeats a cycle period including time in which light emitter 101 emits emission light and the measurement time range K time(s).

Controller 103 performs control of: causing light emitter 101 to emit emission light at a narrow pulse width that is time shorter than half of the segment at each start time of a cycle period in the first time period; and placing light receiver 102 into an exposure state in at least one of the K segment(s) for each of cycle period.

In addition, controller 103 causes light emitter 101 to emit emission light at a wide pulse width that corresponds to time corresponding to half of the segment at each start time of K segment(s) in the cycle period in the second time period. Subsequently, controller 103 performs, in each of the K segment(s) in the cycle period, first exposure period control for placing light receiver 102 into an exposure state at each start time of the segment by a first time duration that is time corresponding to half of the segment and second exposure period control for placing light receiver 102 into an exposure state during a first time duration that starts at the end of the first time duration for the previous segment. It is to be noted that the first exposure period corresponds to an A exposure period indicated below, and the second exposure period corresponds to a B exposure period indicated below.

Next, distance measuring operations performed by distance measuring device 10 configured as above are described.

Figure 10:
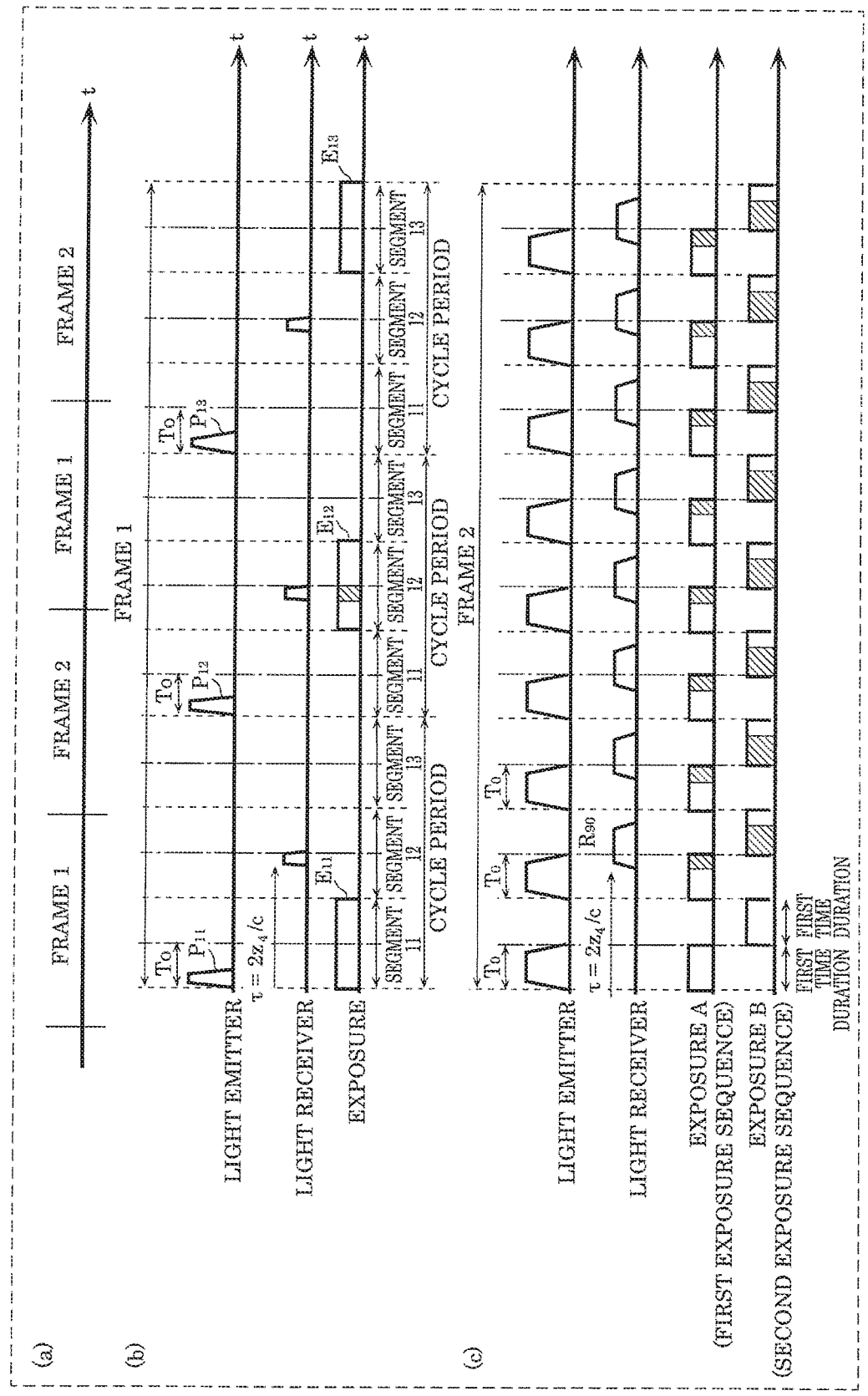
FIG. 10 is a diagram illustrating an example of a sequence of distance measuring operations performed by the distance measuring device according to Embodiment 5.

FIG. 10 is a diagram illustrating an example of a sequence of distance measuring operations performed by distance measuring device 10 according to this embodiment. The same elements as in FIG. 2 are assigned the same reference signs, and thus are not described in detail again.

In (b) of FIG. 10, the distance to measurement target 60 is measured using a distance measuring method similar to the one in (a) of FIG. 2 referred to in Embodiment 1. Here, (b) of FIG. 10 is not explained in detail because it is the same as (a) of FIG. 2 expect that the segment to which reflected light returns is segment 12, and that there is no waiting time between cycle periods. It is to be noted that waiting time may be provided between cycle periods in the first time period.

In the second time period illustrated in (c) of FIG. 10, light emitter 101 alternately repeats light emission and light extinction at a same time width (first time), and light receiver 102 receives light at two different exposure sequences which are respectively synchronized with the light emission and the light extinction performed by light emitter 101. Subsequently, controller 103 calculates the distance between measurement target 60 and distance measuring device 10 based on the ratios of intensity of reflected light obtained respectively in these exposure sequences.

The measurement principle is described in detail below with reference to (c) of FIG. 10. In this embodiment, light emitter 101 emits light by first time T0 and then extincts the light by first time T0, and repeats this sequence. Here, first time $T_0$ is time corresponding to half of a segment in a first measurement time range. Controller 103 controls light receiver 102 so as to perform each of A exposure (first exposure sequence) in synchronization with light emission by light emitter 101 and B exposure (second exposure sequence) in synchronization with light extinction by light emitter 101. In addition, controller 103 stores, in a not-illustrated memory, each of light intensity SA of reflected light detected by light receiver 102 during A exposure and light intensity SB of reflected light detected by light receiver 102 during B exposure.

It is to be noted that A exposure and B exposure may be performed by different pixels or by the same pixels in light receiver 102.

Here, a following case is considered in which the distance to measurement target 60 is $Z_4$, the point of time at which reflected light returns to distance measuring device 10 is z from the point of time of light emission, and the point of time at which the reflected light returns is represented according to $\tau=(2z_4/c)$<first time T0. In this case, the time width of the reflected light received in A exposure period is T0–τ, and the time width of the reflected light received in B exposure period is T0–(T0–τ)=τ. Thus, the ratio (intensity ratio) between light intensity SA of reflected light detected by light receiver 102 in A exposure and light intensity SB of reflected light detected by light receiver 102 in B exposure can be represented according to Expression 12. Furthermore, the distance between measurement target 60 and distance measuring device 10 can be represented according to Expression 13.

[Math. 11]

$$\frac{S_A - S_B}{S_A + S_B} = \frac{T_0 - 2\tau}{T_0} \qquad \text{(Expression 12)}$$

-continued

[Math. 12]

$$z_4 = \frac{c\tau}{2} = \frac{cT_0}{2}\left(1 - \frac{S_A - S_B}{S_A + S_B}\right) \quad \text{(Expression 13)}$$

Accordingly, when a distance measuring operation is performed using a phase difference method in a second time period illustrated in (c) of FIG. 10, sequential values indicating the distances from distance measuring device 10 to measurement target 60 can be calculated using the signal ratio (SA−SB)/(SA+SB) of the reflected light. The second time period as described above is more advantageous than the first time period in which distances cannot be calculated based on something other than resolutions determined by the time widths of segments.

When the distance to measurement target 60 is long ($\tau > T0$), reflected light of first emission light (light pulse) is detected at or after the point of time of second light emission. Thus, the points of time at which the light pulse returns are the same value in Expression 12 irrespective of the value of n (n is an integer) in $\tau + 2nT0$, and cannot be distinguished.

However, in this embodiment, the distance to the measurement target is known based on the resolution of 2T0 in the first time period, and thus n in L+2nT0 can be determined.

When pulsed light returns in the i-th segment in the first time period, L+2nT0 can be represented according to Expression 14, and thus n is uniquely determined.

[Math. 13]

$$2(i-1)T_0 < \tau + 2nT_0 < 2iT_d \quad \text{(Expression 14)}$$

Expression 15 obtained by substituting the thus calculated $\tau + 2nT0$ as $\tau$ in Expression 13 is a solution in the case where $\tau > T0$ is satisfied.

$$z5 = c(\tau + 2nT0)/2 = cT0/2(1 - (S_A - S_B)/(S_A + S_B)) + cnT0 \quad \text{(Expression 15)}$$

In this way, distances to the measurement target can be obtained as sequential values by performing measurement two times.

The measuring method in this embodiment provides an advantage of being able to uniquely determine the distance from distance measuring device 10 to measurement target 60 by performing AND processing (AND operation) of the result in the first time period and the result in the second time period without feeding back the result in the first time period. When image processing is performed using an image sensor as light receiver 102, it takes approximately several ms for recognition processing, which may limit the frame rate. The present measuring method, however, reduces measurement time by the time for recognition processing.

It is to be noted that the result in the first time period may be fed back and measurement in the second time period may be performed. In this case, there is no need to repeat light emission and light extinction as illustrated in (c) of FIG. 10. It is only necessary to perform, only once, each of A exposure for exposure by T0 from the start time of a segment in which reflected light is detected in the first time period and B exposure for exposure by T0 from the end time of A exposure. In this way, it is possible to reduce the number of times of exposure, and prevent occurrence of pulse-like noise and heat noise due to background light, and thus to prevent reflected light from being erroneously detected.

In addition, an avalanche photodiode (APD) may be used as light receiver 102.

An APD is capable of multiplying a light signal from a single photon to a saturation value in a geiger mode in which a voltage higher than or equal to a breakdown voltage is applied, and thus is capable of increasing the sensitivity of light receiver 102 to a level at which the single photon can be detected. In the geiger mode, the photodiode is likely to be saturated, and noise is amplified. Thus, the geiger mode is suitable for application for detecting presence/absence of light, but is not suitable for application for calculating the absolute value of the amount of light. In a normal mode in which a voltage lower than or equal to the breakdown voltage is applied, the APD can be used as a normal photodiode, and thus the APD is also suitable for application for obtaining the absolute value of a signal intensity.

Accordingly, in this embodiment, it is only necessary, in the first time period, to determine whether light returns during an exposure period or not. Thus, it is advantageous to perform measurement in the geiger mode. In this way, it is possible to perform measurement involving a small number of times of integration in a range including a distant location from which a small amount of light returns. In the second time period, it is advantageous to perform measurement in the normal mode. In this way, the APD is capable of switching light detection properties only by changing a voltage to be applied. With the APD, the single device can perform driving methods suitable for the respective measuring methods in the first time period and the second time period, detect low-intensity light with a high sensitivity, and obtain distances to measurement target 60 as sequential values.

Figure 22:
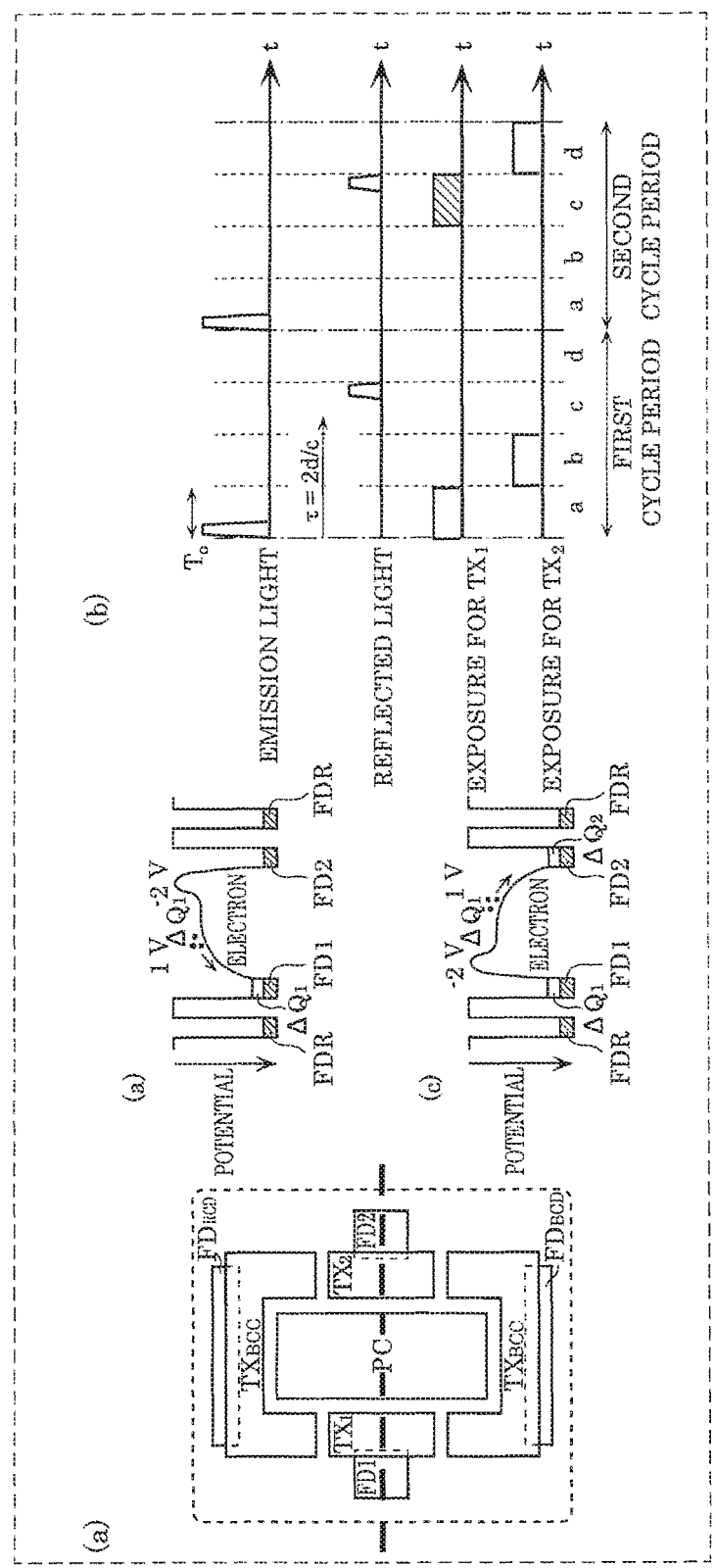
FIG. 22 is a diagram illustrating a pixel circuit configuration and exposure sequences according to Embodiment 5.

It is to be noted that a pixel circuit in this case may be a circuit disclosed in PCT International Publication No. 2010/013779. In particular, in Patent Literature 2, the circuit is used only for measurement similar to the measurement in the second time period. The use of the circuit makes it also possible to perform measurement efficiently in the first time period. FIG. 22 illustrates a pixel circuit configuration and an exposure sequence. As illustrated in (a) of FIG. 22, the pixel circuit is characterized by having two floating diffusion regions (FD1 and FD2). In the second time period, it is possible to measure distance values according to Expression 13 and Expression 9 by storing a signal value denoted as SA in Expression 12, Expression 13, and Expression 9 in one of the floating diffusion regions (for example, FD1) and a signal value denoted as SB in the same expressions in the other floating diffusion region (for example, FD2), and calculating the sum and the difference at a later stage. In the first time period, as illustrated in (b) of FIG. 22, it is possible to perform measurement in two different segments in the same cycle period by varying exposure timings between FD1 and FD2. Furthermore, with a look of the positive or negative sign of the difference value obtainable by performing processing for calculating the difference between the signals at the later stage, it is possible to easily determine to which one of the floating diffusion regions charge is stored. For example, by performing processing for subtracting a signal amount in FD2 from a signal amount in FD1 at the later stage, it is known that reflected light returned in a segment in which exposure was performed in FD1 if the resulting value has a positive value or that reflected light returned in a segment in which exposure was performed in FD2 if the resulting value has a negative value. The use of the method allows to reduce the number of times of pulse emission to the half, and reduce measurement time in the first time period by half.

Embodiment 6

In this embodiment, a description is given of a method for measuring luminance data in addition to distance data.

Distance measuring device 10 according to this embodiment includes a pixel circuit capable of obtaining distance data in a first time period and luminance data in a second time period. In other words, the pixel circuit according to this embodiment includes both of a distance measuring circuit for obtaining the distance data and a luminance measuring circuit for obtaining the luminance data.

Figure 11:
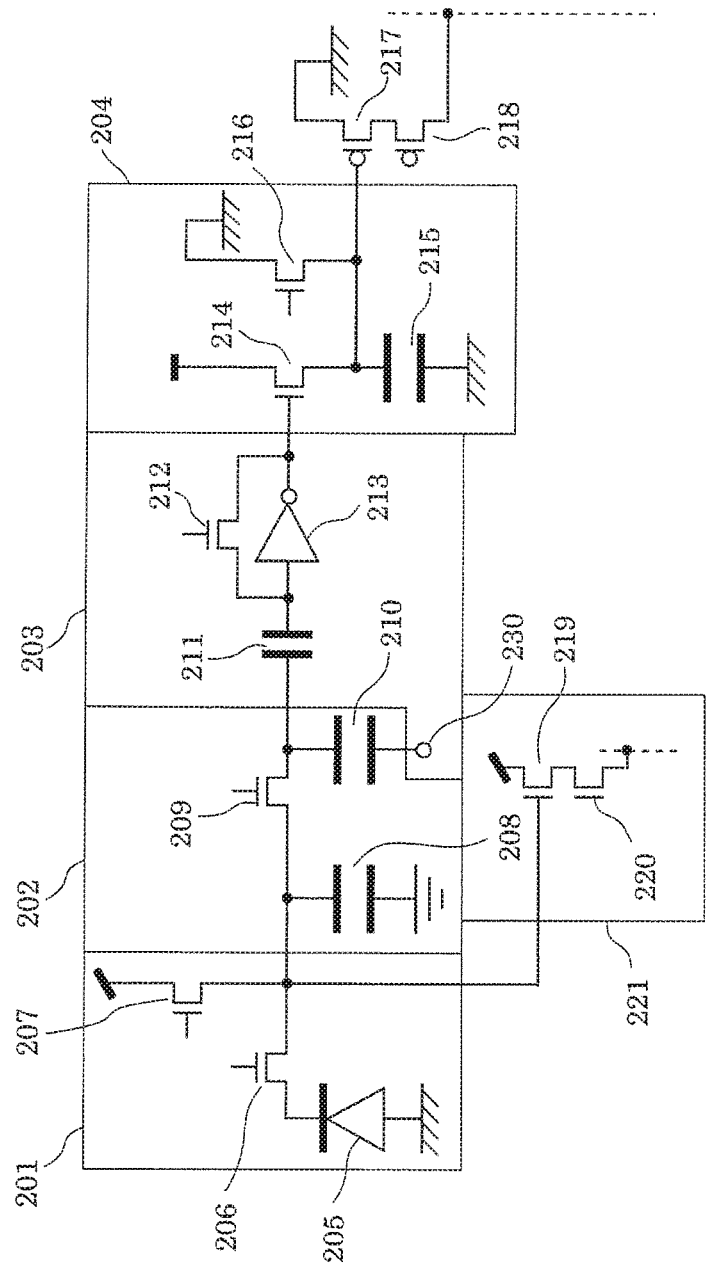
FIG. 11 is a diagram illustrating an example of a circuit configuration of a pixel circuit according to Example 1 of Embodiment 6.

An example of the pixel circuit according to this embodiment is configured as illustrated in FIG. 11, and is capable of measuring both of a distance image data and a luminance image data in the same circuit configuration. Furthermore, the pixel circuit is capable of performing distance measurement and luminance measurement at the same time.

Hereinafter, an example of a circuit configuration of a pixel circuit according to this embodiment is illustrated with reference to the drawings. FIG. 11 is a diagram illustrating the example of the circuit configuration of the pixel circuit according to this embodiment.

As illustrated in FIG. 11, the pixel circuit according to this embodiment includes: light receiving circuit 201; counter circuit 202; comparator circuit 203; storage circuit 204; light receiving element 205; transfer transistor 206; reset transistor 207; charge accumulating capacitor 208; counter transistor 209; counter capacitor 210; direct-current cutting capacitor 211; clamp transistor 212; inverter 213; input transistor 214; storage capacitor 215; storage node reset transistor 216; amplifier transistor 217; selector transistor 218; amplifier transistor for luminance image 219; selector transistor for luminance image 220, and circuit for luminance image 221. Here, 230 denotes an output allowance signal.

The circuit part which performs distance measurement is completely the same as in FIG. 20, and is not described in detail here.

Hereinafter, a circuit for measuring light intensity is described. A combination of parts corresponding to circuit for luminance image 221 and light receiving circuit 201 is the same configuration as a pixel circuit of a normal image sensor. Reset transistor 207 is turned ON first, a transfer gate voltage is applied, light receiving element 205 is reset, then reset transistor 207 is turned OFF, and light reception is performed during $t_a$. This causes charge corresponding to the received light is accumulated in charge accumulating capacitor 208 via transfer transistor 206. After $t_a$ seconds, transfer transistor 206 is turned OFF, and selector transistor for luminance image 220 is turned ON. Triggered by this, an output voltage is read out from amplifier transistor for luminance image 219 to obtain a signal. At this time, it is desirable that a CDS circuit be provided at a later stage, and that an offset voltage be removed when obtaining a luminance signal. With this circuit configuration, it is possible to obtain both of distance and luminance by using the single circuit configuration.

In this embodiment, a solid-state imaging device may be used. For example, the solid-state imaging device may be configured to include light receiver 102 having an image sensor in which distance measuring devices are arranged in a two-dimensional array and further include an optical system configured using a lens etc. as necessary, so as to be capable of measuring a two-dimensional image of distance measurement data. In this case, distance data output by a plurality of pixels are processed, arranged two-dimensionally, and transformed into a distance image, and then the distance image is output. Likewise, luminance data output by a plurality of pixels are processed, arranged two-dimensionally, and transformed into a luminance image, and then the luminance image is output.

Here, the types of obtainable image data are not limited to distance data and luminance data. Other than these data, for example, frequency information may be obtained using a method for providing a filter for shielding or transmitting light having a particular frequency in front of light receiver 102.

In addition, the order of obtaining a luminance image and a distance image does not limit the scope of the present disclosure. Examples of conceivable methods include: methods for alternately repeating luminance image measurement and distance image measurement, specifically a method for repeating a flow of performing luminance measurement after distance measurement in a first time period in Embodiment 1 and performing measurement in a second time period, and then performing luminance measurement, and a method for performing luminance measurement before or after performing distance measurement. In addition, the ratio between the number of times of distance measurement and the number of times of luminance measurement may be any.

In addition, a possible configuration is a configuration which enables recognition of measurement target 60 using a method in which a distance image and a luminance image are subjected to recognition processing at a later stage. In this case, a combination of a distance image and a luminance image enables increase in efficiency of recognition processing. Distance measuring device 10 according to this embodiment firstly performs recognition processing on a distance image to narrow the boundary of measurement target 60. Next, distance measuring device 10 according to this embodiment performs recognition processing again in the region corresponding to the inside of the boundary of measurement target 60 narrowed based on the distance image. Distance measuring device 10 according to this embodiment is capable of performing image recognition further efficiently.

In addition, recognition processing can be performed complementarily using a distance image and a luminance image. When a plurality of measurement target 60 are present, the distance between them is short, and the distance difference is smaller than or equal to a resolution of the distance measuring device, it is impossible to recognize two measurement targets 60 by distinguishing the shapes thereof based on a distance image. Examples include a case of the boundary between a human and ground and a case of a wall and an animal near the wall. In this case, it is possible to recognize the difference in reflection rate between two measurement targets 60 using a luminance image as in this example, and to distinguishedly recognize two measurement targets 60. In the case where recognition is performed using only a luminance image, when two measurement targets 60 distant from each other accidentally have approximately the same luminance values, two measurement targets 60 cannot be distinguished based on the luminance image but can be separately recognized if a distance image is used.

Embodiment 7

In this embodiment, a solid-state imaging device may be used. The solid-state imaging device may be configured to include light receiver 102 having an image sensor and further include an optical system configured using a lens etc. as necessary, so as to be capable of measuring a two-dimensional image of distance measurement data. In this case, it is also possible to obtain each of a distance image in which distance data are arranged two-dimensionally and a luminance image in which luminance data are arranged two-dimensionally. In addition, a configuration is also possible which enables recognition of measurement target 60 using a method in which a distance image and a luminance image are subjected to recognition processing at a later stage.

Although the same exposure timing is set to all pixels even when the light receiver is configured with the plurality of distance measurement devices in Embodiments 1 to 6, exposure may be performed at different timings for the respective pixels.

Example 1

Figure 14A:
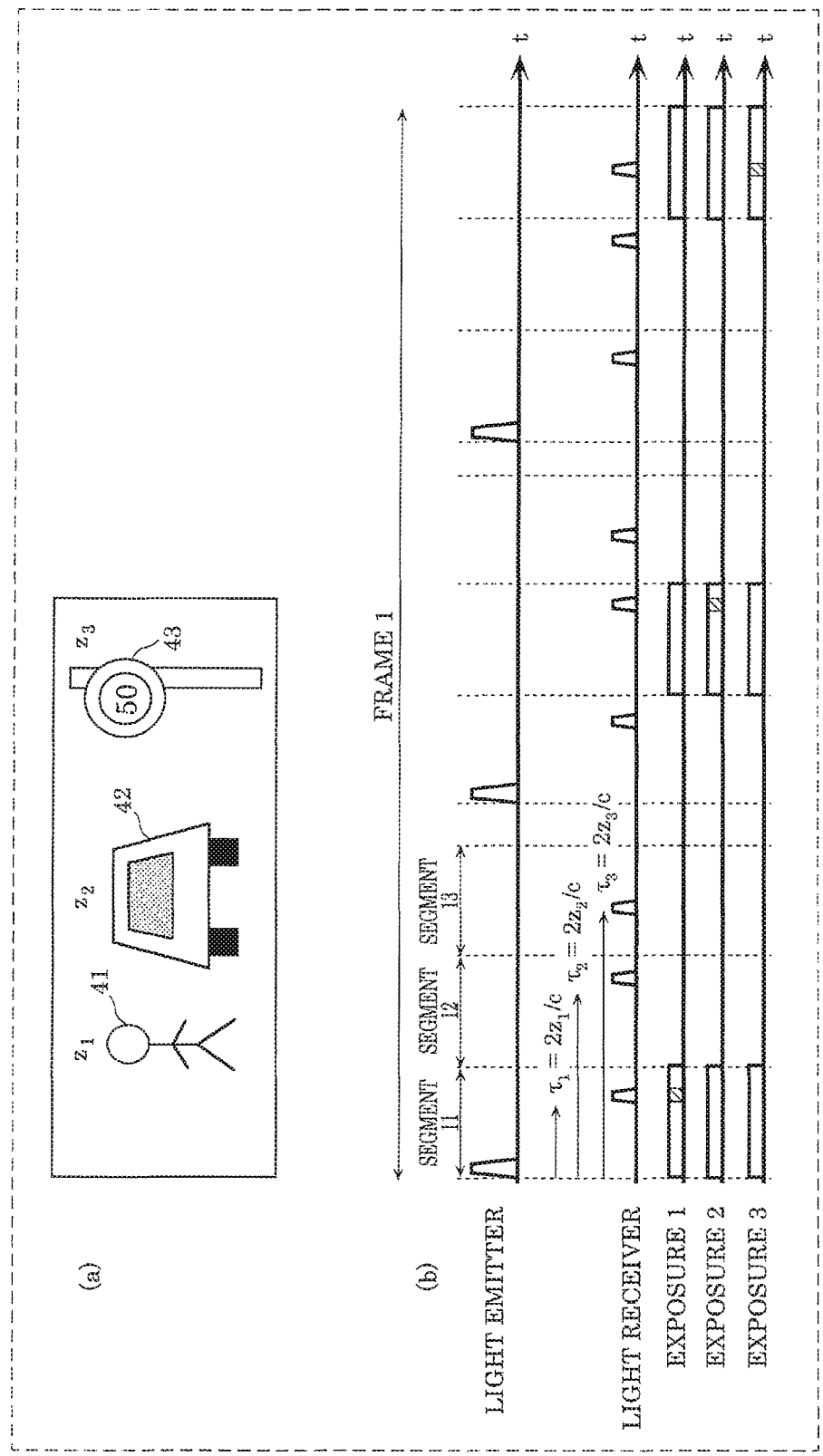
FIG. 14A is a schematic diagram for explaining sequences of exposure performed by the distance measuring device according to Example 3 of Embodiment 6.
Figure 14B:
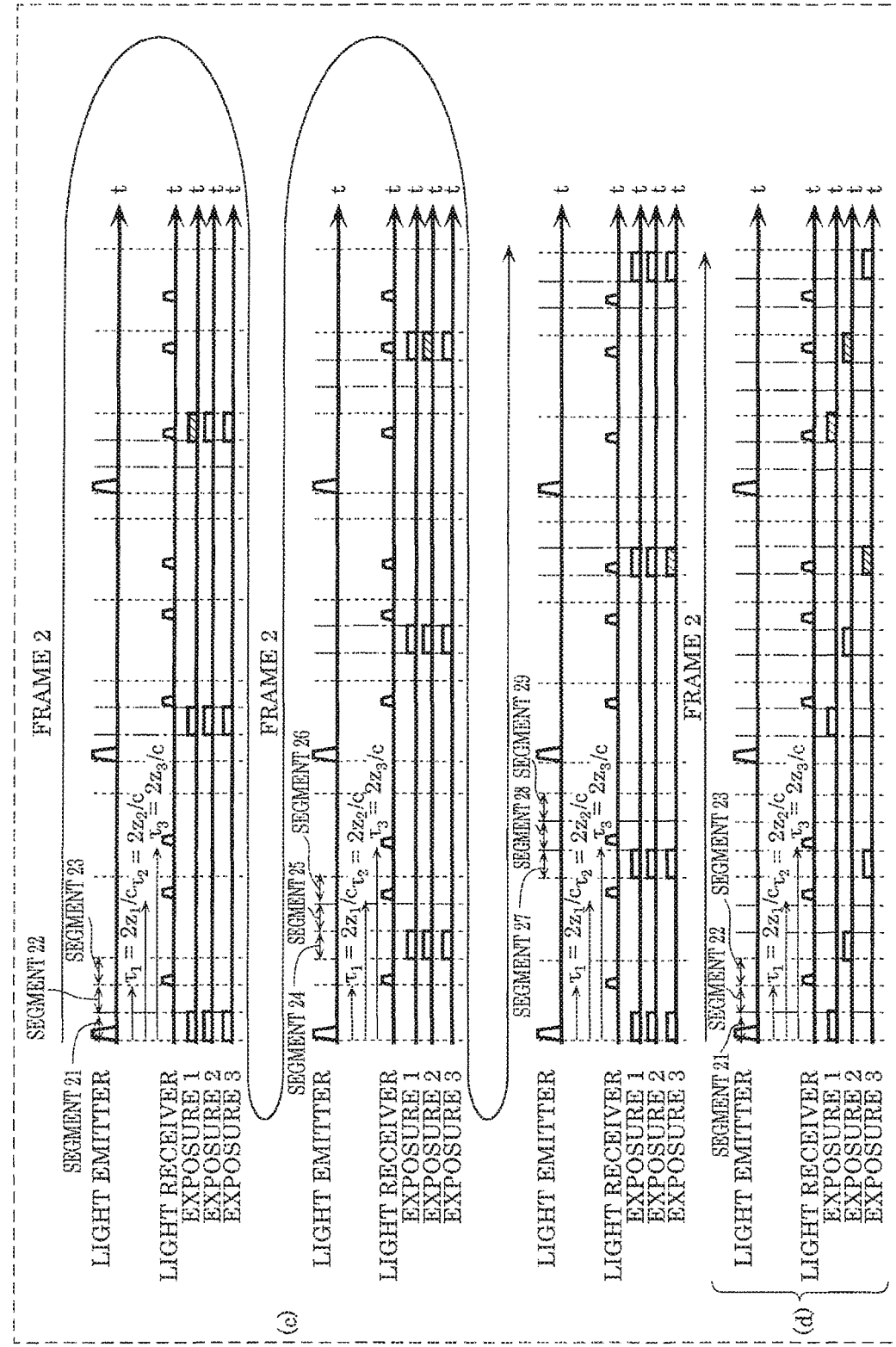
FIG. 14B is a schematic diagram for explaining sequences of exposure performed by the distance measuring device according to Example 3 of Embodiment 6.

FIG. 14A and FIG. 14B are each a schematic diagram for explaining sequences of exposure performed by distance measuring device 10 according to this example. In FIG. 14A, (a) is a schematic diagram illustrating an example of an image including measurement target 60 captured by distance measuring device 10, and (a) illustrates object 41 at distance z1, object 42 at distance z2, and object 43 at distance z3.

Here, (b) of FIG. 14A and (c) of FIG. 14B illustrate driving performed in the case where three objects 41, 42, and 43 which are measurement targets are detected in a first time period, and distance measurement is performed in a second time period in a measurement range limited to the proximity of respective objects 41, 42, and 43 which are the measurement targets, as explained in Embodiment 2 of the present application.

Objects 41, 42, and 43 which are the measurement targets are present at different positions in a distance image. The distance measuring device which detects measurement-target object 41 is referred to as pixel 1 and an exposure sequence is indicated as EXPOSURE 1; the distance measuring device which detects measurement-target object 42 is referred to as pixel 2 and an exposure sequence is indicated as EXPOSURE 2; and the distance measuring device which detects measurement-target object 43 is referred to as pixel 3 and an exposure sequence is indicated as EXPOSURE 3.

In (b) of FIG. 14A, a plurality of measurement targets 60 are present, and respective measurement targets 60 correspond to object 41, object 42, and object 43 which are distant by distance z1, z2, and z3, respectively. Reflected light from object 41, reflected light from object 42, and reflected light from object 43 which are denoted as $\tau_1$ ($=2z_1/c$), $\tau_1$ ($=2z_2/c$), and $\tau_3$ ($=2z_3/c$), respectively returns to the distance measuring device. All of the pixels perform exposure operations at the same time as in (b) of FIG. 2 according to Embodiment 2. No detailed description is provided here.

In (c) of FIG. 14B, a distance measuring operation in a measurement range limited to the proximity of a detected measurement target is repeated for each of measurement-target objects 41, 42, and 43, as explained with reference to (c) of FIG. 4 and FIGS. 6A to 6C according to Embodiment 2.

In the case of (c) of FIG. 14B, distance measurement is performed in finer segments at the proximity of each of measurement-target object 41 at distance z1, measurement-target object 42 at distance z2, and measurement-target object 43 at distance z3. More specifically, measurement needs to be performed in each of nine segments which are segments 21, 22, and 23 obtained by further dividing segment 11, segments 24, 25, and 26 obtained by further dividing segment 12, and segments 27, 28, and 29 obtained by further dividing segment 13, in a first measurement time range. Therefore, measurement time is lengthened.

In view of this, it is advantageous to employ a configuration in which pixel 1 measures the proximity of measurement-target object 41 at distance z1, pixel 2 measures the proximity of measurement-target object 42 at distance z2, and pixel 3 measures the proximity of measurement-target object 43 at distance z3. This configuration makes it possible to reduce measurement time. In particular, since the number of times of exposure of each pixel is reduced by the driving indicated in this example, reduction in background light intensity and heat noise are expected, which provides an effect that erroneous detection is prevented.

Here, a sequence in (d) of FIG. 14B is described in detail. Pixel 1 which detected measurement-target object 41 in a first time period is placed into an exposure state in segments 21, 22, and 22 obtained by further divining a segment (segment 11 in the diagram) including time $\tau_1$ ($=2z_1/c$) which is time corresponding to distance $z_1$ in a first measurement time range. Pixel 2 which detected measurement-target object 42 in a first time period is placed into an exposure state in segments 24, 25, and 26 obtained by further divining a segment (segment 12 in the diagram) including time $\tau_2$ ($=2z_2/c$) which is time corresponding to distance $z_2$ in the first measurement time range. Pixel 3 which detected measurement-target object 43 in a first time period is placed into an exposure state in segments 27, 28, and 29 obtained by further divining a segment (segment 13 in the diagram) including time t3 ($=2z_3/c$) which is time corresponding to distance $z_3$ in the first measurement time range. More specifically, light receiver 102 includes a plurality of pixels each capable of receiving light are arranged two-dimensionally and divided into a plurality of regions in distance measuring device 10 according to this example. Here, each pixel belongs to any of the plurality of regions. Specifically, controller 103 divides a first measurement time range into K (K is a natural number greater than or equal to 1) segment(s) in the first time period, and repeats a cycle period including time during which light emitter 101 emits emission light and the first measurement time range K time(s) (first segment period). Controller 103 performs, at each start time of a cycle period, control for causing light emitter 101 to emit emission light and placing, into an exposure state, all of pixels included in all of the plurality of regions in each of K segments in the cycle period. In the second time period, measurement is performed by defining only the proximity of the segment in which measurement target 60 was detected in the above-described first segment period, as a measurement time range (second measurement time range). The second measurement time range is divided into L (L is a natural number larger than or equal to 1) segments, and a cycle period including time during which light emitter 101 emits emission light and a measurement time range is repeated L times. Controller 103 performs, at each start time of a cycle period, control for causing light emitter 101 to emit emission light and placing one of the plurality of regions into an exposure state in each of the L segments in the cycle period. In particular, controller 103 performs control for placing different regions in each of the plurality of regions into an exposure state in different second segments. In other words, controller 103 performs control for placing the different regions in each of the plurality of regions into an exposure state in the different segments out of the K segments in a cycle period.

It is assumed that controller 103 confirms, in the first time period, that the light receiver has received reflected light reflected by objects 41, 42, and 43 which are the plurality of measurement targets and that the plurality of measurement targets are present in different segments in the K segments. In this case, it is only necessary that controller 103 sets different measurement distance ranges respectively for the plurality of regions in the second time period, and divides the second measurement time range into K' segments according to the different measurement ranges which have been set. In this case, it is possible to determine the measurement range for each of the plurality of pixels (areas) and perform distance measurement.

Hereinafter, actual configurations of a pixel and a pixel circuit are described specifically.

Figure 15:
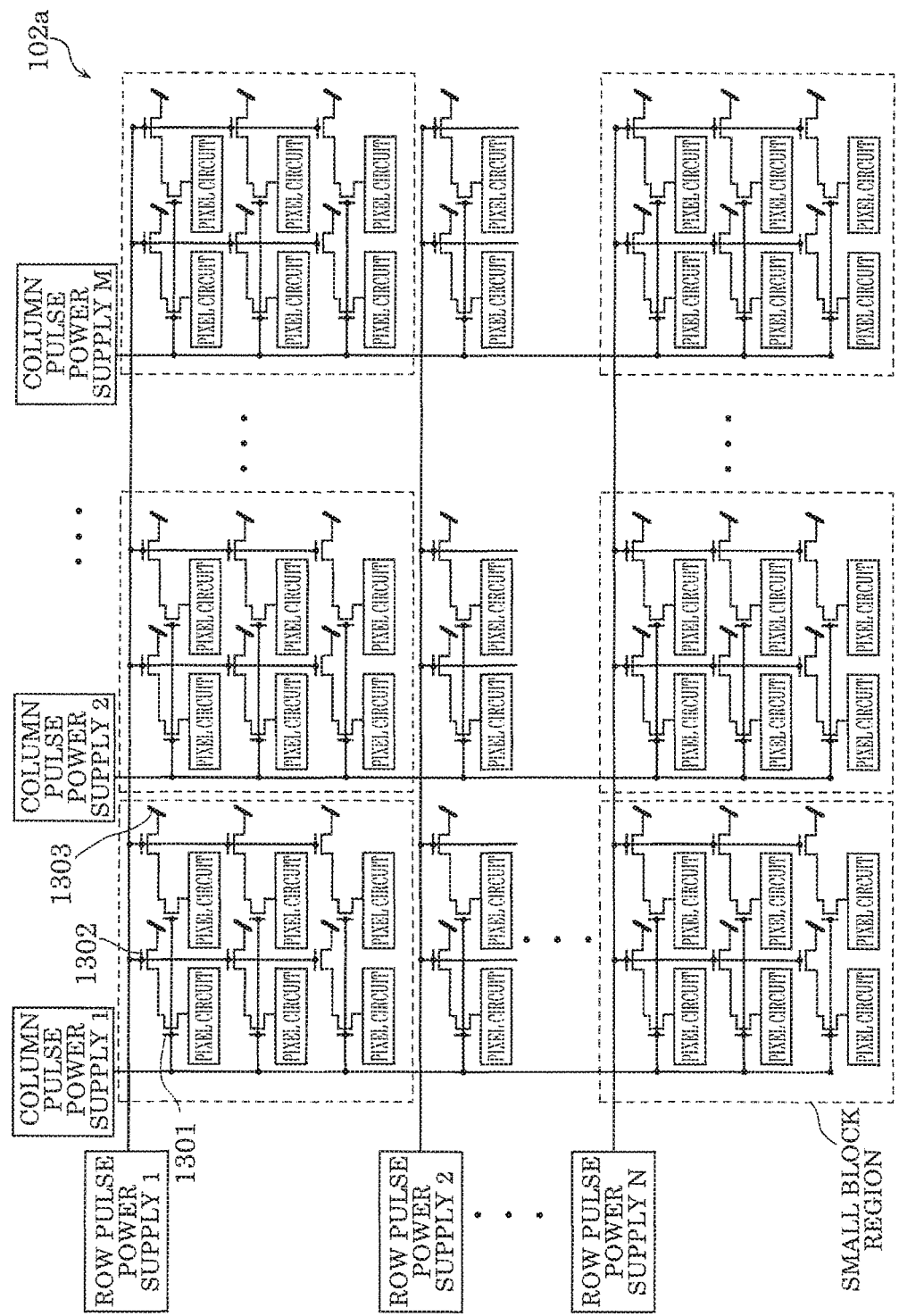
FIG. 15 is a diagram illustrating an example of an image sensor which includes a light receiver according to Example 3 of Embodiment 6.
Figure 16:
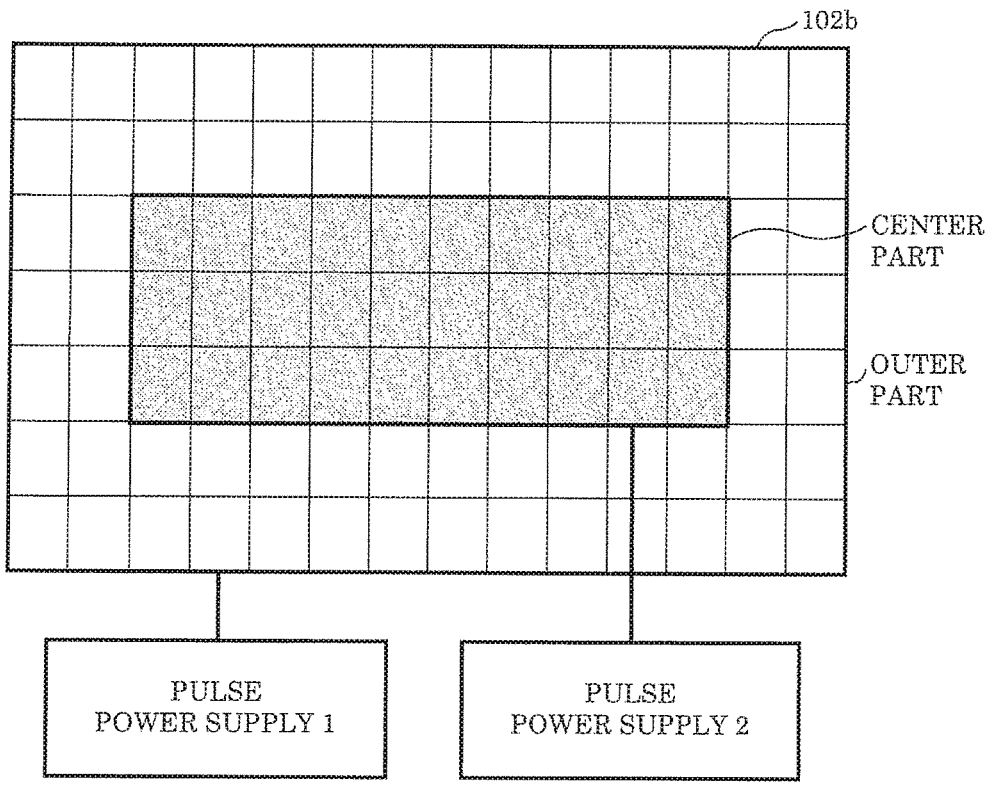
FIG. 16 is a diagram illustrating an example of an image sensor which includes a light receiver according to Example 3 of Embodiment 6.
Figure 17A:
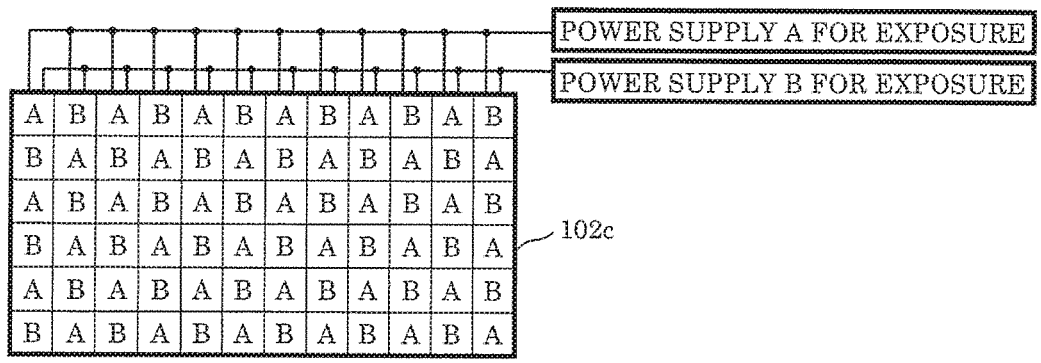
FIG. 17A is a diagram illustrating an example of an image sensor which includes a light receiver according to Example 3 of Embodiment 6.
Figure 17B:
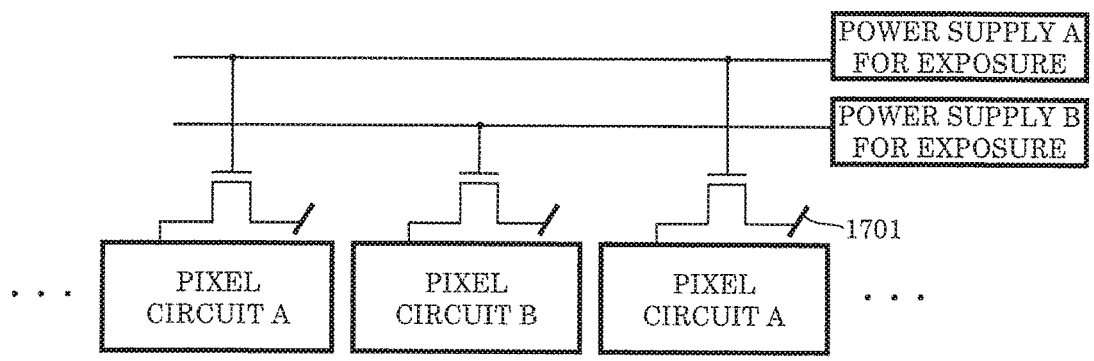
FIG. 17B is a diagram illustrating an example of a control circuit of the image sensor in FIG. 16.

In a general image sensor, a diver circuit for placing light receiver 102 into an exposure state is common for all pixels. In this embodiment, however, exposure timings for the respective pixels are varied by a plurality of driver circuits. FIG. 15, FIG. 16, and FIG. 17A are each a diagram illustrating an example of light receiver 102 which includes an image sensor according to this example. FIG. 17B is a diagram illustrating an example of a control circuit of the image sensor in FIG. 17A.

A conceivable method is a method for dividing pixel array 102a of the image sensor into small regions each having N rows and M columns (N and M are each a natural number) as in FIG. 15. Each of the small block regions includes one or more pixels. A gate driver for exposure is provided for each of rows and columns in the plurality of small block regions, and the gate driver for exposure operates independently. In other words, the N row pulse power supplies and the M column pulse power supplies for exposure are connected correspondingly to the N rows and the M columns in the small block regions so as to enable independent operations thereby. Since row selector transistor 1301 is turned ON when the row pulse power supply is turned ON and column selector transistor 1302 is turned ON when the column pulse power supply is turned ON, power supply voltage 1303 is applied to the pixel circuit included in the small region in which both of row selector transistor 1301 and column selector transistor 1302 are turned ON.

Here, the pixel circuit included in the small region is configured to have, for example, one of the configurations illustrated in FIG. 20 and FIG. 11. In this case, the use of a circuit configuration in which power supply voltage 1303 is used as a trigger power supply for reset transistor 207 makes it possible to implement the pixel circuit which performs exposure illustrated in FIG. 15, which enables independent exposure for each small region of the image sensor.

The method for dividing regions each of which performs exposure independently in the pixel array is any. For example, pixel array 102b may be divided into two compartments of a center part and an outer part as illustrated in FIG. 16, or may be divided concentrically. As a matter of course, all of the pixels may perform exposure independently. Alternatively, measurement conditions may be varied for the respective small regions. For example, in the case illustrated in FIG. 16, a long exposure time width may be taken for the outer part so that it is possible to catch entrance of an object (measurement target 60) from outside of a frame at early timing by performing measurement at a low resolution in a wide measurement distance range, and a short exposure time width may be taken for the center part so that the distance to measurement target 60 in the frame is measured at a high resolution.

In addition, as illustrated in FIG. 17A, light receiver 102 may be configured to have pixels A and pixels B arranged alternately and connected separately to two or more power supplies for exposure.

In this case, a distance image of the same imaging range as the imaging range of the original image can be output by using only pixels A or only pixels B. This is an advantage.

As a matter of course, distance images obtained by pixels A and pixels B may be synthesized, and a final image may be output.

Here, a control circuit for controlling pixel array 102c illustrated in FIG. 17A is configured, for example, as illustrated in FIG. 17B. In the control circuit illustrated in FIG. 17B, transistors connected to only pixel circuits A are turned ON when pulse power supply A is turned ON, and power supply voltage 1701 is applied to only pixels A, and exposure of only pixels A is performed. In addition, transistors connected to pixels B is turned ON when pulse power supply B are turned ON, and power supply voltage 1701 is applied to only pixels B, and exposure of only pixels B is performed.

Compared to pixel array 102a illustrated in FIG. 15, pixel array 102c illustrated in FIG. 17A requires two power supplies and only one transistor per pixel. Thus, the circuits can be configured simply and to be compact. This is an advantage. In pixel array 102a illustrated in FIG. 15, there is a need to select exposure timing in each pixel region depending on the position of measurement target 60 in a frame, such selection is unnecessary in the method indicated in FIG. 17A.

When it is desired to reduce measurement time at the cost of resolution, it is possible to reduce measurement time to at most half by using, for example, a method of performing exposure of segment 11 by pixel A and performing exposure of segment 12 by pixel B in a first cycle period in the first time period illustrated in (b) of FIG. 14A because measurement can be performed in the two segments during the single cycle period.

When three or more power supplies for exposure are used, it is possible to reduce measurement time to time obtained by dividing the measurement time by the number of power supplies.

In FIG. 17A, pixels A connected to power supply for exposure A and pixels B connected to power supply for exposure B are arranged checkerwise, but arrangement types are not limited thereto. For example, three power supplies for exposure may be provided, and pixel A connected to power supply for exposure A, pixel B connected to power supply for exposure B, and pixel C connected to power supply for exposure C may be alternately repeated. Alternatively, the number of power supplies for exposure may be increased, and the number of repetitions may be increased. Any array is possible as a repetition type. Examples other than the checkerwise arrangement include an array in which pixel A, pixel B, . . . appear cyclically in each row, an array in which pixel A, pixel B, . . . appear cyclically in each column, an array in which pixels are arranged at random. The number of power supplies for exposure for use is also any.

Example 2

As in example 1, an element for controlling a region which can be subjected to exposure from outside may be introduced, other than the method for providing a plurality of power supplies for exposure circuits of light receiver 102.

More specifically, light receiver 102 may include a shutter mechanism capable of controlling transmission and shielding of reflected light, in front of light receiving elements. More specifically, distance measuring device 10 includes light receiver 102 having the shutter mechanism, and the shutter is capable of switching an open state in which light can be transmitted and a closed state in which light can be shielded using a method such as mechanical or electrical method.

Figure 18:
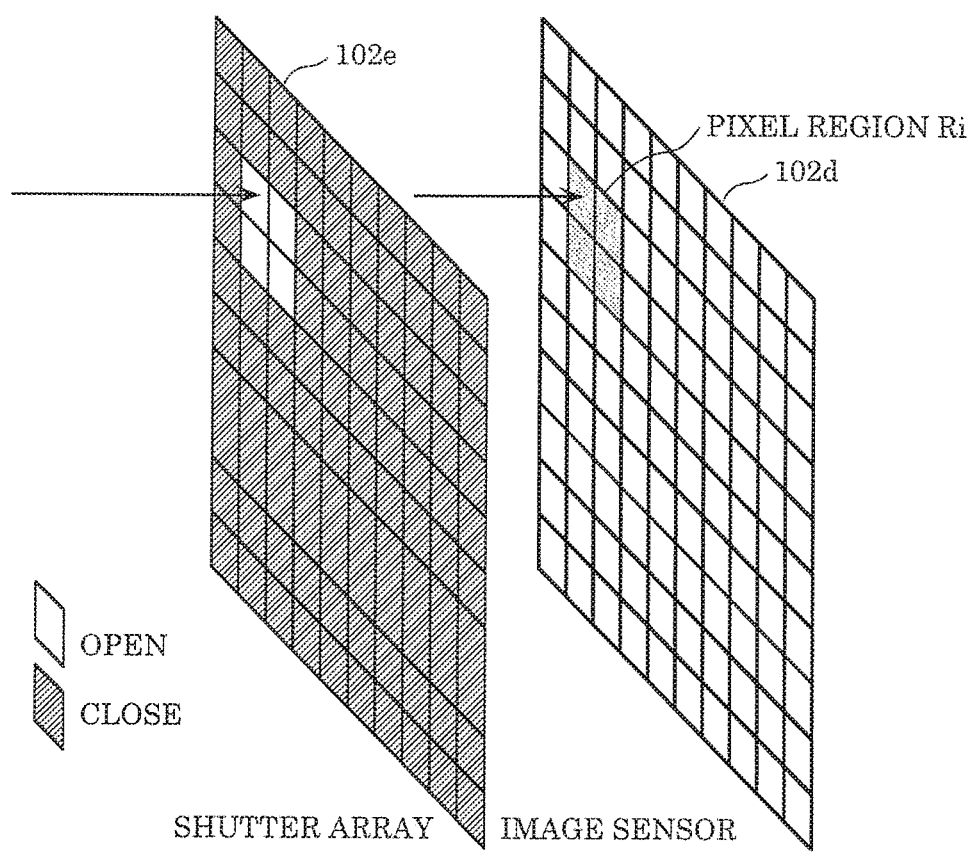
FIG. 18 is a diagram illustrating another example of the image sensor which includes a light receiver according to Example 3 of Embodiment 6.

This case is explained with reference to FIG. 18. FIG. 18 is a diagram illustrating an example of image sensor 102d and shutter array 102e included in light receiver 102 according to this example.

In other words, in this example, shutter array 102e capable of freely performing partial opening and closing on an upper surface of image sensor 102d. In the example of FIG. 18, regions which can be opened or closed independently by shutter array 102e are arranged in an array so that an open state and a closed state of the shutter can be controlled independently for each pixel of the image sensor. The method of arranging the shutter capable of independently controlling an open state and a closed state is not limited to the above-described array arrangement, and any array may be used. Examples include an array in which control can be performed independently for each row and an array in which control can be performed independently for each column.

Shutter array 102e is required to operate at high speed approximately ranging from 10 ns to 1 μs, and thus electronic driving is desirable. A liquid crystal shutter is taken as one such example. It is to be noted that the types of shutters for use are not limited. Other examples include a mechanical shutter which physically moves a shielding body.

In this embodiment, the regions which can be controlled independently to be in an open state and a closed state in the shutter are arranged two-dimensionally corresponding to one or more pixels of image sensor 102d. In the example of the liquid crystal shutter, for example, when the liquid crystal shutter is configured such that liquid crystals transmit light only at the time of receiving applied voltage, the shutter is in an open state during the voltage application.

Figure 23A:
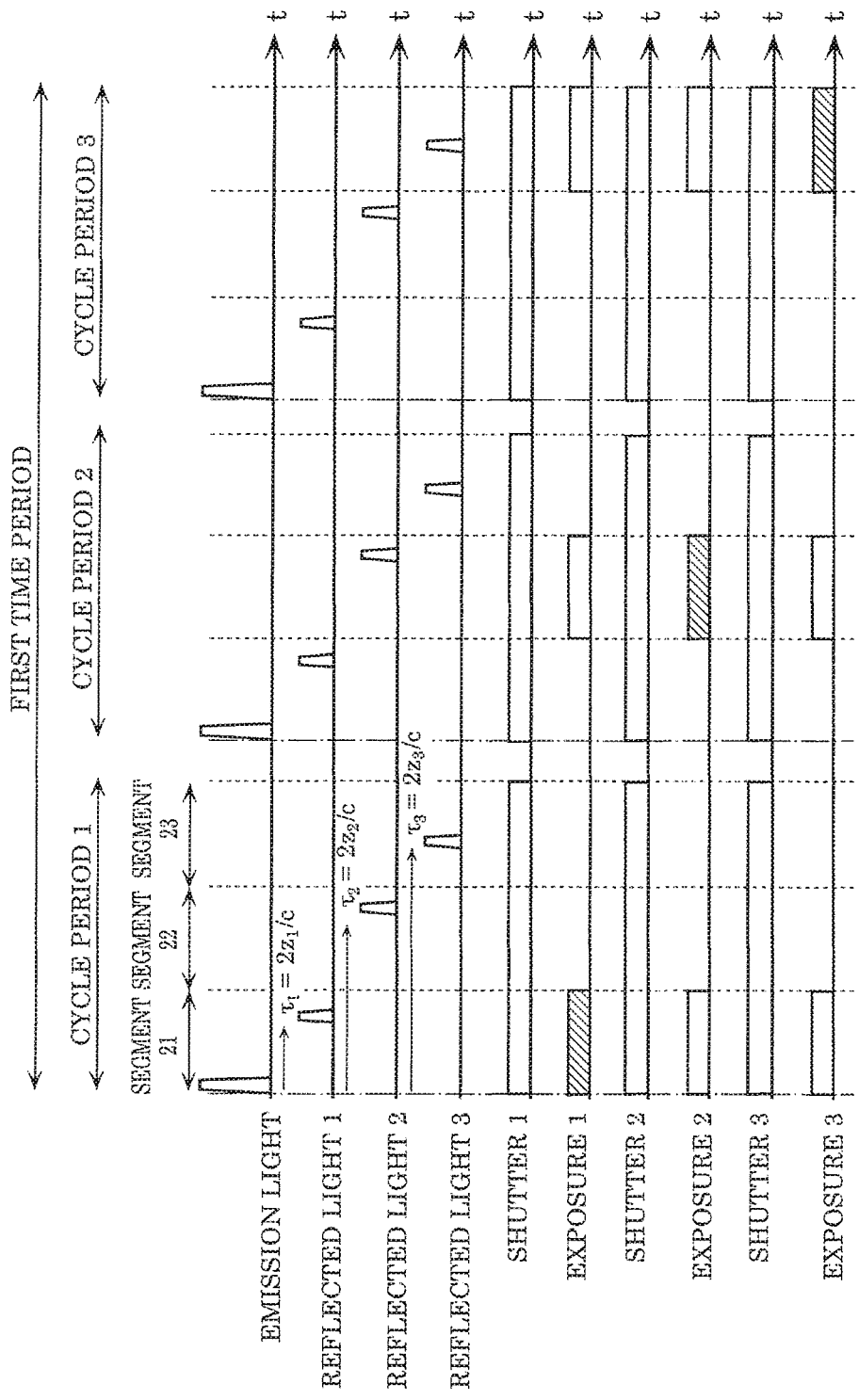
FIG. 23A is a diagram for explaining driving of a shutter array and an image sensor according to Example 2 of Embodiment 7.
Figure 23B:
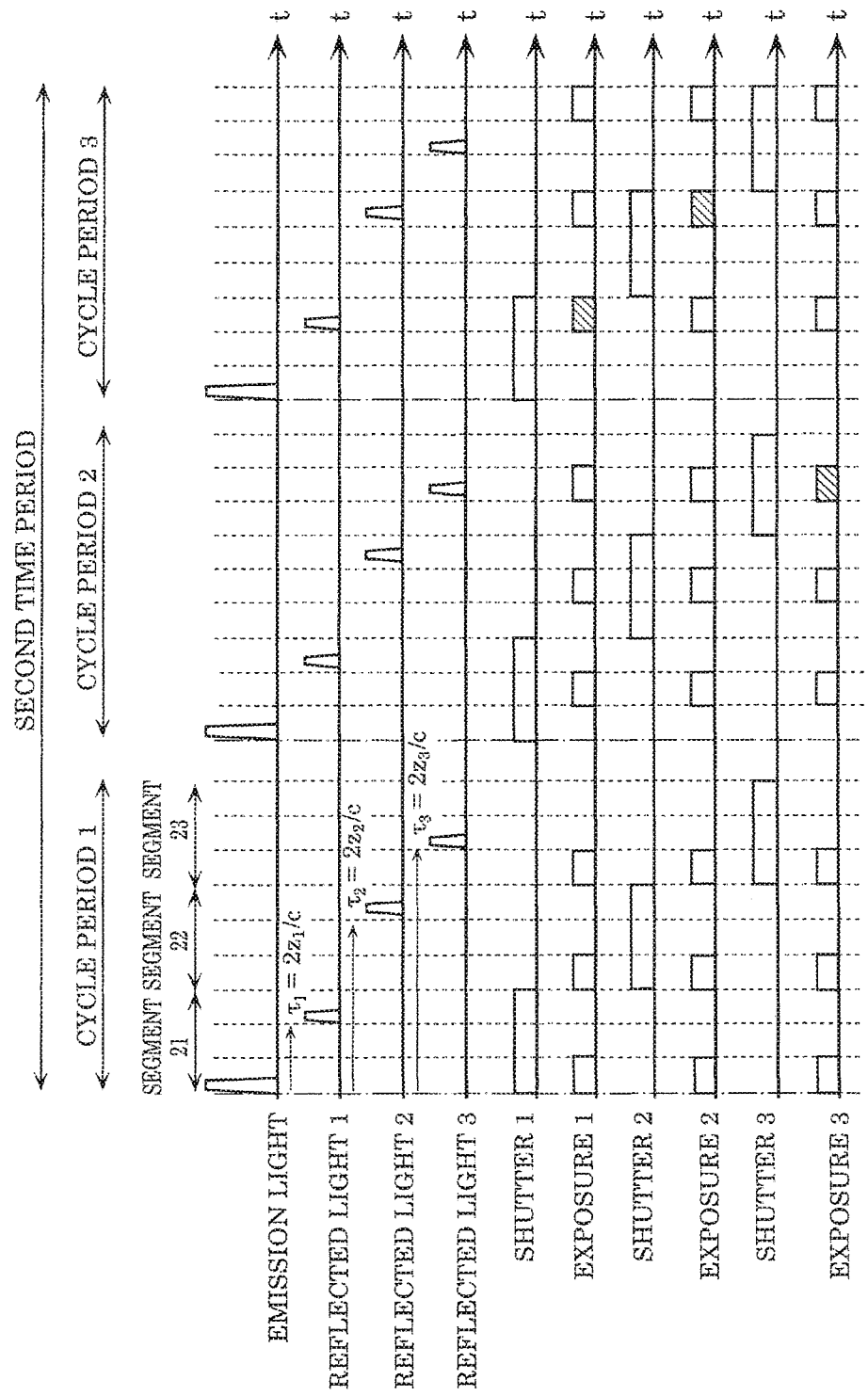
FIG. 23B is a diagram for explaining driving of the shutter array and the image sensor according to Example 2 of Embodiment 7.

Hereinafter, driving of shutter array 102e and image sensor 102d are explained with reference to FIG. 23A and FIG. 23B. FIG. 23A and FIG. 23B illustrate a case where objects 41, 42, and 43 which are measurement targets are at locations distant by distances z1, z2, and z3. At this time, time from when light is emitted to when light reflected by each of the objects returns is τ1, τ2, or τ3 (τi=2zi/c). It is assumed that a pixel which detects measurement-target object 41 is pixel 1, a pixel which detects measurement-target object 42 is pixel 2, and a pixel which detects measurement-target object 43 is pixel 3.

In FIG. 23A and FIG. 23B, return timing of light reflected by measurement-target object 41 is denoted as REFLECTED LIGHT 1, return timing of light reflected by measurement-target object 42 is denoted as REFLECTED LIGHT 2, return timing of light reflected by measurement-target object 43 is denoted as REFLECTED LIGHT 3, exposure timing of pixel 1 is denoted as EXPOSURE 1, exposure timing of pixel 2 is denoted as EXPOSURE 2, exposure timing of pixel 3 is denoted as EXPOSURE 3, opening and closing of a shutter for all of the surfaces of pixels 1 is denoted as SHUTTER 1, opening and closing of a shutter for all of the surfaces of pixels 2 is denoted as SHUTTER 2, and opening and closing of a shutter for all of the surfaces of pixels 3 is denoted as SHUTTER 3.

Controller 103 according to this example always places the entire region of shutter array 102e into an exposure state in a first time period. Image sensor 102d performs the same exposure as in (b) of FIG. 2, and thus no detailed description is given here. In a second time period, only shutter i is placed into an open state in a time period including time point τi, and the shutter is in a closed state in the other time periods. As for exposure, each of K segments obtained by dividing a segment by K in the first time period is further divided into L segments. In the case of an example illustrated in FIG. 23A, K is 3 and L is 3. Thus the segment is divided into nine segments of segments 21, 22, 23, 24, 25, 26, 27, 28, and 29.

In second cycle period 1, the entirety of the first segment in the L segments is exposed, that is, segments 21, 24, and 27 in FIG. 23B are placed into an exposure state. In second cycle period 2, the entirety of the second segment in the L segments is exposed, that is, segments 22, 25, and 28 in FIG. 23B are placed into an exposure state. In second cycle period 3, the entirety of the second segment in the L segments is exposed, that is, segments 23, 26, and 29 in FIG. 23B are placed into an exposure state. This operation is repeated L times so that all of the segments are placed into an exposure state at least once.

Among the above-described operations, detection of reflected light can be performed only when the shutter is in an open state and the pixels are in an exposure state. Thus, light detection timing can be uniquely determined even when exposure is performed plural times in the second cycle period.

Example 3

Although exposure timing is controlled in the above-described example, a method for controlling a reading-out range is also conceivable. For example, measurement of a distance image and recognition of a measurement target may be performed using an image sensor included in light receiver 102 in a first time period, and reading-out of only the proximity of the recognized measurement target may be performed in a second time period. As a matter of course, a third time period, a fourth time period, . . . in which a time period for reading out only the proximity of the recognized measurement target is repeated plural times may be added. Alternatively, only predefined regions may be read out without performing recognition of any measurement target.

Figure 19:
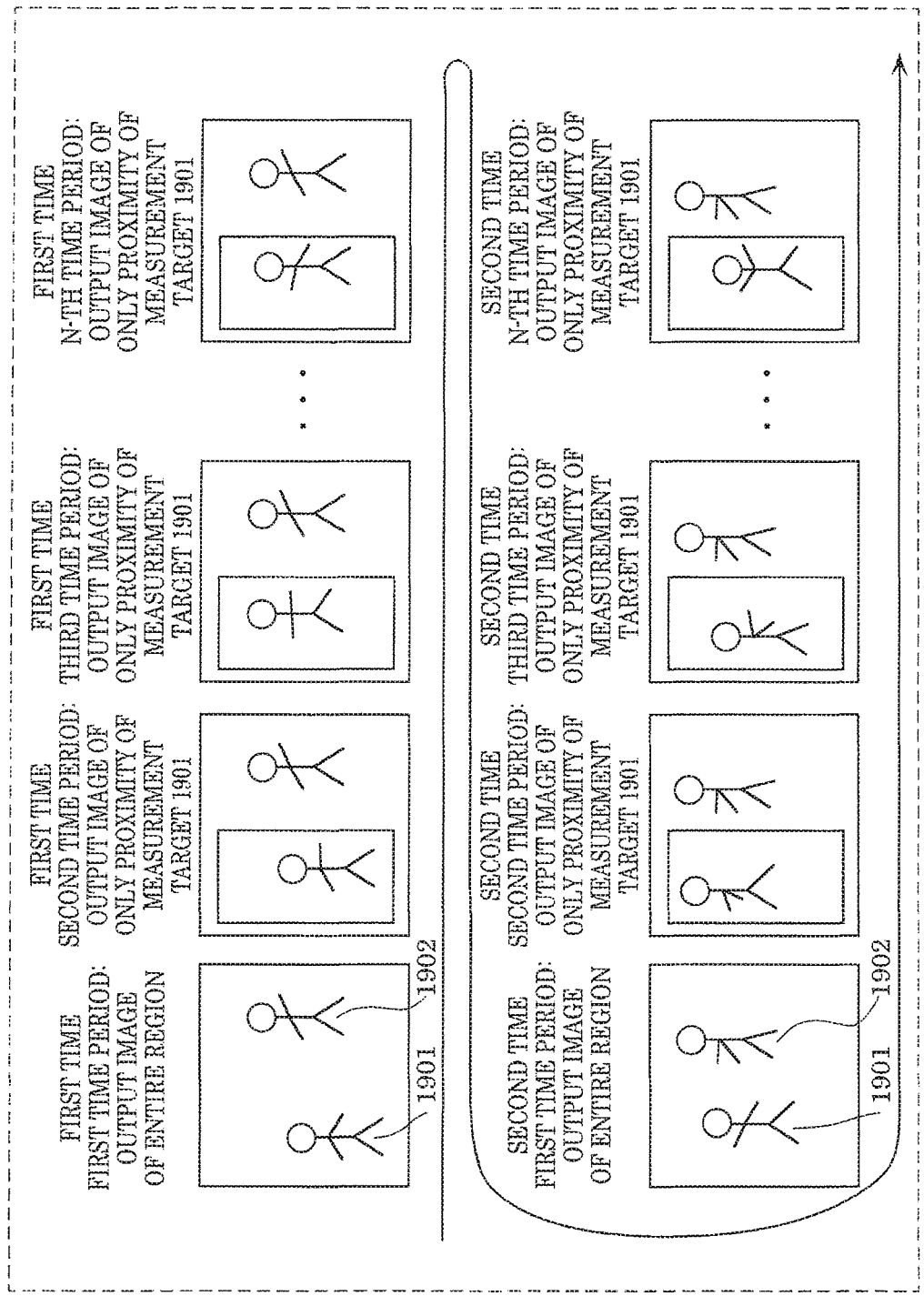
FIG. 19 is a diagram for explaining an example when reading-out time is controlled according to Example 3 of Embodiment 6.

This case is explained with reference to FIG. 19. FIG. 19 is an example of an image sequence of images output using the above-described method for controlling reading-out ranges. First, the entire frame is read out in the first time period. Subsequently, only a region which is part of the frame is read out in each of the second time period, the third time period, . . . an N-th time period (N is an integer greater than or equal to 2). In the example of FIG. 19, only the region including measurement target 1901 is read out. The region to be read out may be arbitrarily determined by a user, or may be defined by an algorithm. At this time, image recognition processing etc. may be included.

By limiting the region from which a signal is read out, it is possible to reduce time for reading out the signal and outputting a resulting image. In this way, for example, it is possible to capture a video of a measurement target with motion at a high frame rate.

In particular, an advantageous effect can be expected when this is combined with the method for performing distance measurement while predicting a next image described in Embodiment 3.

In the measurement in a Q-th time period (Q is an integer greater than or equal to 4) in Embodiment 3, a target distance is predicted in advance, and at this time, results different from the predicted results may be obtained. At this time, it is possible to quickly respond to abrupt data change by providing distance measurement in which reading-out is performed only by the pixels from which the unexpected results were obtained. For example, it is possible to quickly detect abrupt entrance of an object such as a human and an animal into a frame. This can be applicable to, for example, an accident prevention method in on-vehicle application.

As described above, the embodiments have been explained as examples of techniques according to the present disclosure. For illustrative purposes, the attached drawings and detailed explanations have been provided.

Accordingly, the constituent elements illustrated in the attached drawings and described in DETAILED DESCRIPTION OF THE EMBODIMENT may include not only constituent elements which are essential to solve the problem but also constituent elements which are not essential to solve the problem and provided to illustrate the technique. For this reason, these inessential constituent elements should not be regarded as essential ones directly because the inessential constituent elements are illustrated in the attached drawings and described in DETAILED DESCRIPTION OF THE EMBODIMENT.

In addition, since the above embodiment has been provided to illustrate the technique according to the present disclosure, it is possible to make various kinds of modification, replacement, addition, omission etc. within the scope of the claims or equivalents.

As non-limiting examples, measurement conditions in distance measuring operations are varied for each frame period in the above-described embodiments. Measurement conditions such as conditions for light source parameters of a light emitter may be changed for each of segments in a measurement distance time range, that is, each of distance segments in a measurement distance range. For example, the distance measuring device may divide a measurement distance range that starts from the distance measuring device into distance segments which are a plurality of segments corresponding to different distance ranges. The distance measuring device may perform distance measuring operations for each distance segment by performing control for varying light source parameters for a light emitter such that a product of light emission intensity of a light pulse, the number of times of light emission, and a pulse width which are included in the light source parameters of the light emitter is proportional to a square of a maximum measurement distance in the distance segment, and causing the light emitter to emit light at least once for each distance segment using the light source parameters.

In other words, the distance measuring device divides the measurement distance range which has been set by a user into one or more segments (distance segments), and performs distance measuring operations according to (measurement distances corresponding to) the distance segments. The number of divisions and division widths may be determined each time by the user, or may be set in advance.

Figure 25:
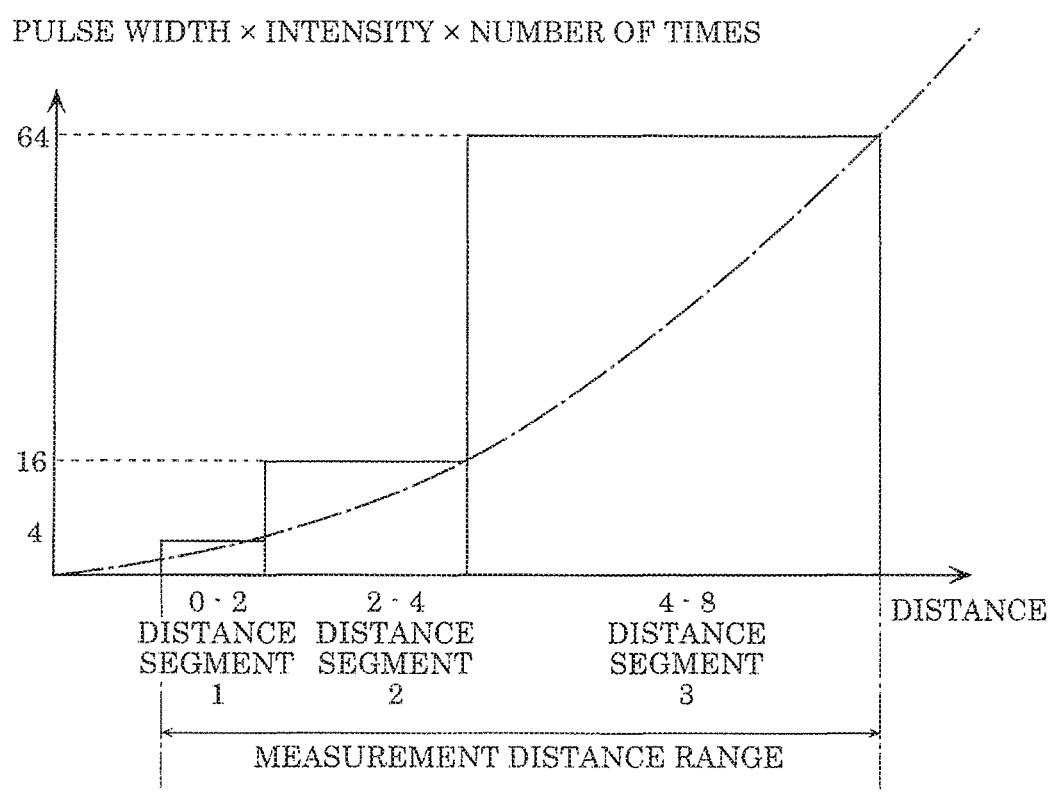
FIG. 25 is a diagram for explaining distance segments in a distance measurement range and variation in light source parameter between distance segments.

FIG. 25 is a diagram for explaining distance segments in a distance measurement range and variation in light source parameter between the distance segments. Here, with reference to FIG. 25, a description is given of a case of dividing a measurement distance range into segments (distance segments) which are range 1 corresponding to a measurement distance ranging from 0 to 2, range 2 corresponding to a measurement distance ranging from 2 to 4, and range 3 corresponding to a measurement distance ranging from 4 to 8. It is to be noted that the number K of distance segments may be arbitrarily selected from among natural numbers. The widths of distance segments may be equal, or may be proportional to the measurement distances corresponding to the distance segments as illustrated in FIG. 25. The width of a distance segment corresponding to a measurement distance which is particularly focused by the user may be small, or measurement distances and distance segment widths may be determined according to a table which has been set in advance.

Curve P represented by alternate long and short dashed lines in FIG. 25 indicates measurement conditions represented by product P of light emission intensity I of a light pulse, the number N of times of light emission, and pulse width W which are light source parameters for the light emitter in each distance segment. Control circuit 103A controls a laser light source of the light emitter under the measurement conditions represented by the curve in each distance segment. FIG. 25 indicates that product P of light emission intensity I of the light pulse, the number N of times of light emission, and pulse width W which are light source parameters for the light emitter is controlled to be proportional to the square of the maximum measurement distance in each distance segment. Here, when a constant of proportionality is assumed to be A (A is a positive number), the value of product P may be set to a value larger than a value obtained by multiplying the maximum measurement distance in each distance segment with constant of proportionality A.

Accordingly, as illustrated in FIG. 25 for example, at least one measurement condition may be further different between, for example, a first time period in range 1 and a second time period in range 2. The at least one measurement condition is one of a light emission intensity of pulsed light which is the emission light, the number of times of light emission, and a light pulse width. At this time, the value of the product of the light emission intensity of the pulsed light which is the emission light, the number of times of light emission, and a light pulse width may be set to be larger in a measurement distance range including a farther midpoint out of midpoints in the first measurement distance range and the second measurement distance range than in a measurement distance range including a closer midpoint.

In addition, the present disclosure encompasses other embodiments obtainable by arbitrarily combining constituent elements of the above-described embodiments, variation obtainable by adding, to the above-described embodiments, various modifications that a person skilled in the art would arrived at without deviating from the scope of the present disclosure, and various kinds of devices that mount the distance measuring device according to the present disclosure.

It is to be noted that the present disclosure can be implemented not only as the distance measuring device having the above-described unique configuration but also as a distance measuring method performed by the distance measuring device.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to distance measuring devices, and particularly to on-vehicle devices for collision prevention or automatic driving, distance measuring devices, or devices using distance measuring methods.

What is claimed is:

1. A distance measuring device, comprising:
a light emitter which emits emission light;
a light receiver capable of receiving, during exposure, reflected light resulting from the emission light and reflected by a measurement target;
a controller which controls the light emitter and the light receiver;
a distance calculator which calculates a distance from the distance measuring device to the measurement target, based on time from when the light emitter emits the emission light to when the light receiver receives the reflected light; and
an output terminal which outputs the calculated distance, wherein the controller:
sets, in a first time period, a first measurement time range which corresponds to a first measurement distance range;
causes the light emitter to emit emission light and places the light receiver into an exposure state, in the first measurement time range;
sets, in a second time period, a second measurement time range which corresponds to a second measurement distance range; and
causes the light emitter to emit emission light and places the light receiver into the exposure state, in the second measurement time range,
at least one measurement condition is different between the first time period and the second time period, and
the distance calculator calculates the distance from the distance measuring device to the measurement target, based on the time from when the light emitter emits the emission light to when the light receiver receives the reflected light, the time being in at least one of the first time period and the second time period, and
wherein the at least one measurement condition being one of a light emission intensity of pulsed light which is the emission light, a number of times of light emission, and a light pulse width, and
a value of a product of the light emission intensity of the pulsed light, the number of times of light emission, and the light pulse width is set to be larger in one of the first measurement distance range and the second measurement distance range which has a midpoint farther than in the other of the first measurement distance range and the second measurement distance range.

2. The distance measuring device according to claim 1, wherein the measurement condition is at least one of: a time range corresponding to a measurement distance range; a number of times of divisions when dividing the time range corresponding to a measurement distance range into a plurality of segments; a pulse width of pulsed light which is the emission light; a number of pulses of the pulsed light; an intensity of the pulsed light; exposure time; an exposure cycle; a number of times of exposure; a range of image reading by the light receiver; and control of a driver circuit for the light receiver.

3. A distance measuring device, comprising:
a light emitter which emits emission light;
a light receiver capable of receiving, during exposure, reflected light resulting from the emission light and reflected by a measurement target;
a controller which controls the light emitter and the light receiver;
a distance calculator which calculates a distance from the distance measuring device to the measurement target, based on time from when the light emitter emits the emission light to when the light receiver receives the reflected light; and
an output terminal which outputs the calculated distance, wherein the controller:
sets, in a first time period, a first measurement time range which corresponds to a first measurement distance range;
causes the light emitter to emit emission light and places the light receiver into an exposure state, in the first measurement time range;
divides, a second measurement time range which corresponds to a second measurement distance range into K' segments in a second time period, K' being a natural number larger than or equal to 2; and
repeats a first cycle period including time during which the light emitter emits emission light and the second measurement time range, and places the light receiver into the exposure state at least in one segment in the K' segments, in at least one of the first cycle periods, and
the distance calculator calculates the distance from the distance measuring device to the measurement target, based on the time from when the light emitter emits the emission light to when the light receiver receives the reflected light, the time being in at least one of the first time period and the second time period.

4. The distance measuring device according to claim 3, wherein the controller performs control of:
dividing the first measurement time range into K segments in the first time period, K being a natural number larger than or equal to 2;
repeating, K times, a second cycle period including time during which the light emitter emits emission light and the first measurement time range;
causing the light emitter to emit emission light for each second cycle period;
placing the light receiver into the exposure state at least in one segment in the K segments for each second cycle period; and
varying a measurement condition between the first time period and the second time period, and
the distance calculator calculates the distance from the distance measuring device to the measurement target, based on the time from when the light emitter emits the emission light to when the light receiver receives the reflected light in each of the first time period and the second time period.

5. The distance measuring device according to claim 3, wherein the controller determines a measurement condition in the second time period, based on the distance from the distance measuring device to the measurement target, the distance being calculated in the first time period.

6. The distance measuring device according to claim 5, wherein the controller changes the second measurement distance range in the second time period when the controller confirms, in the first time period, that no reflected light has been received by the light receiver and that no measurement target is present in the first measurement distance range.

7. The distance measuring device according to claim 5, wherein when the controller confirms, in the first time period, that the reflected light has been received by the light receiver and that the measurement target is present in an L-th segment in the K segments based on the reflected light, L being a natural number smaller than or equal to K, in the second time period, the controller performs control of:

dividing the second measurement time range into K' segments, the second measurement time range being smaller than the first measurement time range which includes the L-th segment and used in the first time period, K' being a natural number larger than or equal to 2;

repeating, K' times, a second cycle period including time during which the light emitter emits emission light and the second measurement time range; and placing the light receiver into the exposure state at least in the one segment in the K' segments for each second cycle period, and the distance calculator calculates the distance from the distance measuring device to the measurement target, based on the time from when the light emitter emits the emission light to when the light receiver receives the reflected light in the second time period.

8. The distance measuring device according to claim 7, wherein when the controller confirms, in the second time period, that the reflected light has been received by the light receiver and that the measurement target is present in an N-th segment in the K' segments, N being a natural number smaller than or equal to K', in a third time period following the second time period, the controller performs control of:

dividing a third measurement time range into O segments, the third measurement time range being smaller than or equal to the second measurement time range which includes the N-th segment and used in the second time period, O being a natural number larger than or equal to 2;

repeating, O times, a third cycle period including time during which the light emitter emits emission light and the third measurement time range; and placing the light receiver into the exposure state at least in one segment in the O segments for each third cycle period, and the distance calculator calculates the distance from the distance measuring device to the measurement target, based on the time from when the light emitter emits the emission light to when the light receiver receives the reflected light in the third time period.

9. The distance measuring device according to claim 8, wherein when the controller confirms that the reflected light has been received by the light receiver and that the measurement target is present in a P-th segment in the O segments, P being a natural number smaller than or equal to O, the distance calculator:

calculates a difference distance which is a difference between a distance calculated in the third time period and a distance calculated in the second time period; and calculates a ratio between the difference distance and time from start time of the N-th segment in the second time period to start time of the P-th segment in the third time period, and, based on the ratio, calculates a velocity of the distance measuring device in a direction of travel of the emission light.

10. The distance measuring device according to claim 9, wherein the controller performs control of:

adding, to a distance calculated in the third time period, a value obtained by multiplying the velocity and time from start time of the third time period to start time of a fourth time period following the third time period, and based on a resulting value, predicting a distance range in which the measurement target is present in the fourth time period; and in the fourth time period:

dividing, into a plurality of segments, a fourth measurement time range which includes a time range corresponding to the predicted distance range and is smaller than the third measurement time range;

repeating, the plurality of times, a fourth cycle period including time during which the light emitter emits emission light and the fourth measurement time range; and placing the light receiver into the exposure state at least in one segment in the plurality of segments for each fourth cycle period.

11. The distance measuring device according to claim 3, wherein the light receiver includes a plurality of pixels each capable of receiving light and arranged two-dimensionally, the light receiver is divided into a plurality of regions to any of which each of the plurality of pixels belongs, and at least in the first time period, the controller performs control of:

dividing the first measurement time range into K segments, and repeating, K times, a second cycle period including time during which the light emitter emits emission light and the first measurement time range, K being a natural number larger than or equal to 2;

causing the light emitter to emit emission light at a narrow pulse width which corresponds to time shorter than half of a K segment, at each start time of the second cycle period; and placing one of the plurality of regions into the exposure state in each of the K segments in the second cycle period.

12. The distance measuring device according to claim 11, wherein the controller performs control for placing each of the plurality of regions into the exposure state in a corresponding one of segments in the K segments in the second cycle period.

13. The distance measuring device according to claim 11, wherein when the controller confirms, in the first time period, that the light receiver has received reflected light reflected by a plurality of measurement targets and that the plurality of measurement targets are present in different segments in the K segments, in the second time period, the controller sets different measurement distance ranges respectively for the plurality of regions, and divides the second measurement time range into K' segments according to the different measurement distance ranges.

14. The distance measuring device according to claim 11, wherein a gate driver for exposure is provided for each of rows and columns in the plurality of regions, the gate driver for exposure operating independently.

15. The distance measuring device according to claim 3, wherein the controller varies a cycle of light emission by the light emitter between the first measurement time range and the second measurement time range.

16. The distance measuring device according to claim 3, wherein the light receiver includes a plurality of pixels each capable of receiving light and arranged two-dimensionally, the controller:

obtains a distance image relating to the distance to the measurement target, based on reflected light received by at least part of the plurality of pixels in the first time period out of the first time period and the second time period;

obtains a luminance of reflected light received by at least part of the plurality of pixels in the second time period, and obtains a luminance image relating to the luminance of the measurement target; and recognizes the measurement target based on the distance image and the luminance image.

\* \* \* \* \*